US011283616B2

(12) United States Patent
Xu et al.

(10) Patent No.: US 11,283,616 B2
(45) Date of Patent: Mar. 22, 2022

(54) METHOD FOR INDEX-BASED AND INTEGRITY-ASSURED SEARCH IN A BLOCKCHAIN

(71) Applicant: Hong Kong Baptist University, Hong Kong (HK)

(72) Inventors: Jianliang Xu, Hong Kong (HK); Ce Zhang, Changchun (CN); Cheng Xu, Wuhan (CN)

(73) Assignee: Hong Kong Baptist University, Hong Kong (HK)

( * ) Notice: Subject to any disclaimer, the term of this patent is extended or adjusted under 35 U.S.C. 154(b) by 247 days.

(21) Appl. No.: 16/828,982

(22) Filed: Mar. 25, 2020

(65) Prior Publication Data

US 2020/0322159 A1    Oct. 8, 2020

Related U.S. Application Data

(60) Provisional application No. 62/829,005, filed on Apr. 3, 2019.

(51) Int. Cl.
| | |
|---|---|
| *H04L 29/06* | (2006.01) |
| *H04L 9/32* | (2006.01) |
| *H04L 9/06* | (2006.01) |
| *G06F 17/18* | (2006.01) |
| *G06F 16/901* | (2019.01) |

(52) U.S. Cl.
CPC ........ *H04L 9/3236* (2013.01); *G06F 16/9027* (2019.01); *G06F 17/18* (2013.01); *H04L 9/0637* (2013.01); *H04L 2209/38* (2013.01)

(58) Field of Classification Search
CPC . H04L 9/3236; H04L 9/0637; H04L 2209/38; H04L 9/083; H04L 2209/30; H04L 2209/56; G06F 16/9027; G06F 17/18
See application file for complete search history.

(56) References Cited

U.S. PATENT DOCUMENTS

| | | | | |
|---|---|---|---|---|
| 2016/0283920 | A1* | 9/2016 | Fisher | ................... H04L 9/3297 |
| 2019/0334920 | A1* | 10/2019 | Kelly | ................... H04L 9/3239 |
| 2019/0370241 | A1* | 12/2019 | Miraldo | .................... H04L 9/32 |
| 2020/0051043 | A1* | 2/2020 | Wilson | ................. G06Q 20/405 |
| 2020/0084041 | A1* | 3/2020 | Xu | ......................... H04L 9/3247 |
| 2020/0127833 | A1* | 4/2020 | Konda | .................... H04L 63/00 |
| 2020/0266989 | A1* | 8/2020 | Krcmaricic-Barackov ................. H04W 12/06 |
| 2020/0385320 | A1* | 12/2020 | Meyer | ....................... C05F 3/00 |

OTHER PUBLICATIONS

Qiang Qu et al., "On Spatio-Temporal Blockchain Query Processing," Future Generation Computer Systems, vol. 98, 2019, pp. 208-218.

(Continued)

*Primary Examiner* — Mahfuzur Rahman
(74) *Attorney, Agent, or Firm* — Idea Intellectual Limited; Margaret A. Burke; Sam T. Yip

(57) ABSTRACT

The present invention relates to methods for a blockchain search system, and particularly, the present invention relates to methods for assuring the data integrity on blockchain hybrid storage. Furthermore, the present invention provides a cost-efficient update scheme to maintain the on-chain index and authenticated data structure and is efficient and scalable under various operational parameters.

11 Claims, 16 Drawing Sheets

(56) References Cited

OTHER PUBLICATIONS

Shengshan Hu et al., "Searching an Encrypted Cloud Meets Blockchain: A Decentralized, Reliable and Fair Realization", IEEE INFOCOM, 2018, pp. 792-800.
Cheng Xu et al., "vChain: Enabling Verifiable Boolean Range Queries over Blockchain Databases", SIGMOD' 19, 2019, pp. 141-158.
Bin Liu et al., "Blockchain based data Integrity Service Framework for IoT data", IEEE 24th International Conference or Web Services, 2017, pp. 468-475.
Patrick O'Neil et al., "The log-structured merge-tree (LSM-tree)," Acta Informatica, vol. 33, No. 4, 1996, pp. 351-385.
Yinan Li et al., "Tree Indexing on Flash Disks", IEEE International Conference on Data Engineering, 2009, pp. 1303-1306.
Feifei Li et al., "Dynamic Authenticated Index Structures for Outsourced Databases", SIGMOD, 2006, pp. 121-132.

\* cited by examiner

METHOD FOR INDEX-BASED AND INTEGRITY-ASSURED SEARCH IN A BLOCKCHAIN

CROSS REFERENCE OF RELATED APPLICATION

This application is a Non-provisional application that claims priority to U.S. Provisional Patent Application No. 62/829,005 filed on Apr. 3, 2019, which is hereby incorporated by reference in its entirety.

FIELD OF THE INVENTION

The present invention relates to methods of a blockchain search system and particularly, the present invention relates to methods for assuring the data integrity on blockchain hybrid storage. Furthermore, the present invention provides a cost-efficient update scheme to maintain the on-chain index and authenticated data structure. The present invention is efficient and scalable under various system parameters.

BACKGROUND OF THE INVENTION

Blockchain technology has been envisioned as a disruptive technology for a number of industries, including finance, insurance, supply chain, and healthcare, among many others. The blockchain is a secure data structure which can be maintained by untrusted peers in a decentralized peer-to-peer (P2P) network. The integrity of the data stored in the blockchain is upheld through two security designs: the hash-chain technique and the consensus protocol. They together ensure that the data stored in the blockchain are immutable and that each peer in the network stores the same replicas of the data.

Blockchain technology has been a hot research area in recent years and attracted much attention due to the great success in the adoption of cryptocurrencies and proliferation of decentralized applications. Owing to its immutability property and consensus protocol, blockchain offers a new solution for trusted storage and computation services. To scale up the services, prior research has suggested a hybrid storage architecture, where only small meta-data is stored on-chain and the raw data is outsourced to off-chain storage. To protect data integrity, a cryptographic proof can be constructed online for queries over the data stored in the system. However, the previous schemes only support exact-matching retrieval. In this invention, a novel method for index-based and integrity-assured search in blockchain is provided. The key challenge lies in how to design an authenticated data structure (ADS) that can be efficiently maintained by the blockchain, in which a unique gas cost model is employed.

Various issues of the blockchain technology have been widely studied, such as consensus algorithms, storage designs, system security, and privacy issues. A benchmark framework for analyzing representative private blockchains was presented a searchable encryption scheme over the blockchain with integrity assurance was proposed. But it is limited to file-level keyword search. Moreover, it does not investigate the indexing issue as only on-chain data are considered. More recently, a novel vChain framework to enable verifiable queries over blockchain databases was developed. To support dynamic data aggregation over arbitrary query attributes, an accumulator-based ADS scheme was proposed. In addition, some startups (e.g., FlureeDB, BigchainDB) have proposed to expose a relational database frontend to the blockchain data storage. However, all these existing studies fail to consider the integrity issue when outsourcing query processing to off-chain storage services, which is the focus of this invention.

Authenticated Query Processing

There is a large body of research on authenticated query processing, verifying the integrity of query results produced by an untrusted service provider. There are two basic techniques for query authentication, namely digital signature chaining and Merkle Hash Tree (MHT). The former is a public-key message authentication scheme based on asymmetric cryptography. A digital signature is produced for each data object by the data owner using a private key. A client can verify the authenticity of a query result using the owner's public key and the object's signature. To establish the completeness of query results, chaining signatures are generated to capture the correlation of each object with its neighboring objects. Signature chaining is simple, but it requires each object to be signed and thus cannot scale up to large datasets.

MHT solves the scalability issue using a hierarchical tree structure. MHT has been adapted to various index structures. Typical examples include the Merkle B-tree for relational data, the Merkle R-tree for spatial data, and the authenticated inverted index for text data. It has also been extended to support authenticated join queries, distributed and shared data. Nevertheless, to the best of the inventors' knowledge, no previous works exist that study authenticated relational queries for data stored in a hybrid-storage blockchain.

SUMMARY OF THE INVENTION

It is an objective of the present invention to provide methods for a blockchain search system and methods for assuring the data integrity in blockchain hybrid storage. Furthermore, the present invention provides a gas-efficient update scheme to maintain the on-chain index and authenticated data structure (ADS). It is further objective of the present invention to provide such methods that are efficient and scalable under various operational parameters.

In a first aspect of the present invention, there is provided a method of providing an authenticated data structure (ADS) for a blockchain database comprising:

splitting the blockchain database into two or more partitions using data statistics of the blockchain database;

generating an index and the ADS for each of the partitions comprising:

providing one or more of Merkle B-tree, a suppressed Merkle B-tree, and a combination thereof for each of the partitions of the blockchain database; and generating the index and the ADS for each of the partitions;

maintaining both the index and the ADS during a data insertion operation of the blockchain database using a recursive merge algorithm;

maintaining the index and the ADS during a data update operation and a data deletion operation of the blockchain database using an in-place algorithm; and using the ADS for authentication in a search operation of the blockchain database.

According to an embodiment of the first aspect of the present invention, the blockchain database is organized into a set of exponentially-sized partitions with a first partition containing one Merkle B-tree and each of the other partitions containing no more than two suppressed Merkle B-tree.

According to an embodiment of the first aspect of the present invention, a Merkle B-tree is generated for the first of the partitions, the generation comprising:

building a B-tree over the data stored in the first partition;

for each leaf node of the B-tree, computing a hash $h(v)$ using a digest of the underlying data v;

for each non-leaf node of the B-tree, computing a hash $h(h_l\|h_r)$ from the children of the current node by concatenating their respective hashes and applying the hash $h(h_l\|h_r)$ on the concatenated hashes, and authenticating the Merkle B-tree based on the hash of the root node.

According to an embodiment of the first aspect of the present invention, the suppressed Merkle B-tree is generated for each of the partitions other than the first partition of the blockchain database, the generation comprising:

reading unsorted data of the current partition from the blockchain database;

building the Merkle B-tree in memory in real time; and only storing the hash of the Merkle root in the blockchain database.

According to an embodiment of the first aspect of the present invention, the two or more relatively smaller partitions than the others are merged recursively into a relatively bigger partition in batch and wherein the Merkle roots of said partitions are updated during the data insertion operation.

According to an embodiment of the first aspect of the present invention, the data update and deletion operations are executed by locating the partition of the data update or deletion and updating the corresponding Merkle root.

According to an embodiment of the first aspect of the present invention, a service provider uses Merkle B-tress or suppressed Merkle B-trees to answer the blockchain database search request from a user and generates a corresponding verification object (VO).

A second aspect of the present invention provides a method for providing a scalable blockchain database search service with data integrity comprising:

providing a hybrid data storage comprising a blockchain and a cloud storage to store the blockchain database for the scalable blockchain database search service;

providing a smart contract to maintain an on-chain index and an ADS built according to the method of the first aspect of the present invention, and providing the built ADS to answer blockchain database search requests from users with an integrity assurance.

According to an embodiment of the second aspect of the present invention, the blockchain database is built by steps comprising:

uploading raw data $o=<k, v>$ to a cloud service provider for data storage;

computing a digest $h(v)$ of the uploaded raw data using a collision resistant cryptographic hash function $h(\bullet)$, and uploading the digest $h(v)$ and other information of the uploaded raw data to the blockchain in the form of a blockchain transaction.

According to an embodiment of the second aspect of the present invention, the on-chain index and ADS is maintained by the smart contract via steps comprising:

blockchain miners receiving an update transaction from a data owner on the same blockchain network and verifying the authenticity of the received transaction;

the blockchain miners executing the on-chain index and ADS maintenance algorithms using the digest $h(v)$ and other information of the data obtained from the transaction;

the blockchain network synchronizing the new index and ADS obtained from the miners and verifying their correctness through a blockchain consensus protocol, and the cloud service provider updating an off-chain index and ADS with respect to the changes to the on-chain index and ADS.

According to an embodiment of the second aspect of the present invention, the cloud service provider answers blockchain database search requests with integrity assurance via steps comprising:

a user submitting a search request parameter $Q=[lb, ub]$ to the cloud service provider;

the cloud service provider receiving the search request from the user and computing the search result from the blockchain database thereof using the off-chain index;

the cloud service provider computing a corresponding verification object (VO) using the ADS with respect to the search request;

the cloud service provider sending the search results and VO to the user, and the user verifying soundness and completeness of the search result using the VO received from the cloud service provider and the ADS retrieved from the blockchain network.

Those skilled in the art will appreciate that the invention described herein is susceptible to variations and modifications other than those specifically described.

The present invention includes all such variation and modifications. The invention also includes all of the steps and features referred to or indicated in the specification, individually or collectively, and any and all combination or any two or more of the steps or features.

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the present invention.

Furthermore, throughout this specification and claims, unless the context requires otherwise, the word "include" or variations such as "includes" or "including", will be understood to imply the inclusion of a stated integer or group of integers but not the exclusion of any other integer or group of integers.

Other definitions for selected terms used herein may be found within the detailed description of the present invention and apply throughout. Unless otherwise defined, all other technical terms used herein have the same meaning as commonly understood to one of ordinary skill in the art to which the invention belongs.

Other aspects and advantages of the present invention will be apparent to those skilled in the art from a review of the ensuing description.

BRIEF DESCRIPTION OF THE DRAWINGS

The above and other objects and features of the present invention will become apparent from the following description of the invention, when taken in conjunction with the accompanying drawings, in which.

DETAILED DESCRIPTION OF THE INVENTION

Figure 1:
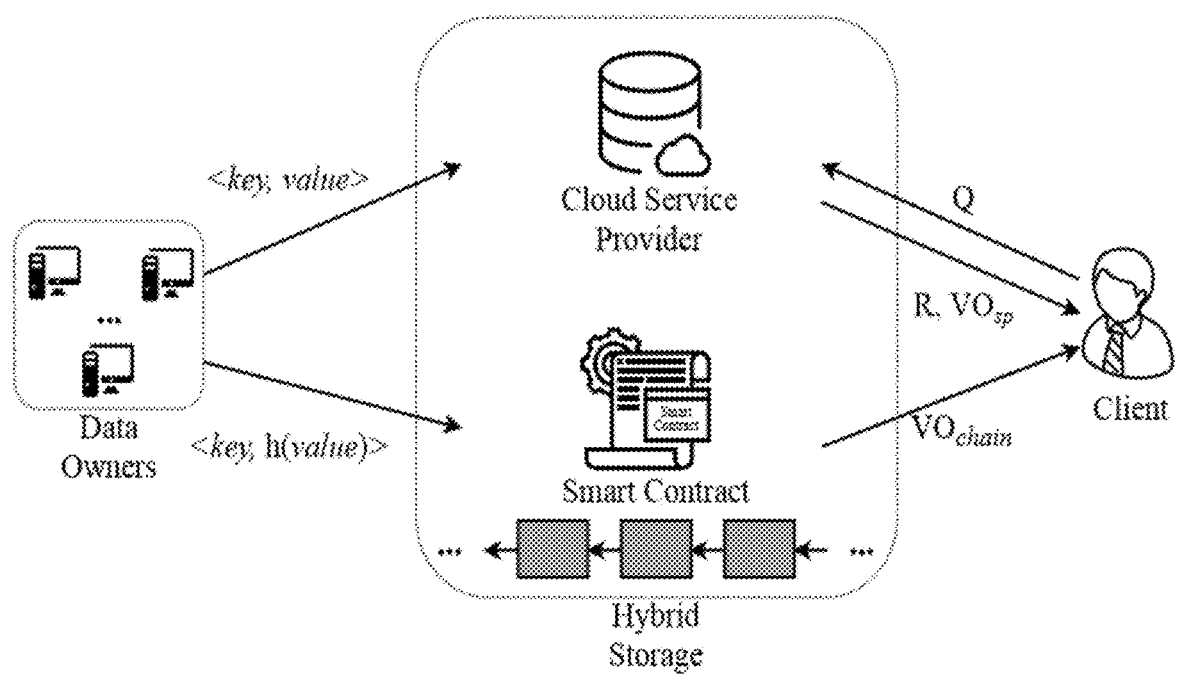
FIG. 1 shows an authenticated query framework in hybrid-storage blockchain.

The present invention is not to be limited in scope by any of the specific embodiments described herein. The following embodiments are presented for exemplification only.

In a first aspect of the present invention, provided are methods for providing scalable blockchain search service with data integrity assurance, comprising:

Using a hybrid data storage comprising a blockchain and a third-party cloud service provider to store the database for a scalable blockchain search service;

Using a smart contract to maintain an on-chain index and ADS; and

Using the ADS from the previous step to respond to blockchain search from users with integrity assurance.

In a first embodiment of the first aspect of the present invention, there is presented a method wherein the data owner outsources the database to a blockchain hybrid storage, comprising:

The data owner uploading the raw data <o=(k, v)> to a third-party cloud service provider for data storage;

The data owner computing the digest h(v) of the uploaded data for the previous step using a collision resistance cryptographic hash function h(•); and The data owner uploading the digest h(v) from the previous step and other information of the uploaded data to the blockchain in the form of a blockchain transaction.

In a second embodiment of the first aspect of the present invention there is presented a method wherein an on-chain index and ADS is maintained by the smart contract, comprising:

The miners of the blockchain network receiving the update transaction from the data owner and verify the authenticity of the received transaction;

The miners of the blockchain network executing the index and ADS maintenance algorithms using the digest and other information of the data obtained from the transaction;

The blockchain network synchronizing the new index and ADS obtained from the miners and verify their correctness through the blockchain consensus protocol; and The service provider updating the off-chain index and ADS with respect to the on-chain changes.

In a third embodiment of the first aspect of the present invention there is presented a method wherein the service provider answers blockchain search with integrity assurance, comprising:

A user submitting the search parameters Q=[lb, ub] to the service provider;

The service provider receiving the search request from the user and computes the search result from its database using the off-chain index;

The service provider computing a verification object (VO) using the ADS with respect to the search request;

The service provider sending the search results and VO from the previous steps to the user; and The user verifying the soundness and completeness of the search results using the VO from the service provider and the ADS retrieved from the blockchain network.

In a second aspect of the present invention there is presented methods for providing a gas-efficient update scheme to maintain the on-chain index and authenticated data structure, comprising:

Using a partition scheme to split the database into a set of exponentially-sized partitions;

Using a combination of Merkle B-Tree (MB-tree) and suppressed Merkle B-tree (SMB-tree) to build index and ADS for each of partition from the previous step;

Using a recursive merge algorithm to maintain the index and ADS during data insertion;

Using an in-place location algorithm to maintain the index and ADS during data update and deletion; and Using the ADS from the previous step to support authenticated search over blockchain database.

In a first embodiment of the second aspect of the present invention, there is presented a method wherein the storage space is organized into a set of exponentially-sized partitions with each partition containing up to two subtrees.

In a second embodiment of the second aspect of the present invention, there is presented a method wherein a Merkle B-tree is built on the first partition of the database, comprising:

Building a B-tree over the data stored in the first partition;

For each leaf nodes, computing a hash h(v) using the digest of the underlying data v;

For each non-leaf nodes, computing a hash from the children of the current node (e.g. $h_l$, $h_r$) by concatenating their hashes and applying the cryptographic hash on the concatenating string, that is $h(h_l \| h_r)$; and Using the hash of the root node to authenticate the Merkle B-tree.

In a third embodiment of the second aspect of the present invention, there is presented a method wherein a suppressed Merkle B-tree is built for each partition of the database other than the first one, comprising:
  Reading the unsorted data of the current partition from the storage;
  Building the Merkle B-tree in memory on the fly; and
  Storing only the hash of the Merkle root in the storage.

In a fourth embodiment of the second aspect of the present invention, there is presented a method wherein an algorithm is employed to recursively merge two small partitions into a big one and compute the updated Merkle roots of the corresponding partition during the data insertion.

In a fifth embodiment of the second aspect of the present invention, there is presented a method wherein an algorithm handles the data update and deletion by locating the partition of the data entry and updates the corresponding Merkle root.

In a sixth embodiment of the second aspect of the present invention, there is presented a method wherein the service provider uses MB-tree/SMB-trees to answer the blockchain search requests from the users and generates corresponding VO.

In the third aspect of the present invention there is presented a method for further reducing the ADS maintenance cost without sacrificing much the query performance comprising:
  Using data distribution statistics to split the database into several partitions;
  Applying the method developed in the second aspect of the present inventions to build index and ADSs which only consist of SMB-trees for each the region obtained from the previous step; and
  Using one fully-structured MB-tree to store the data for the first partition whereas using one or two suppressed MB-trees for each of the remaining partitions.

Methodology of Invention

The blockchain was originally invented to serve as a transaction ledger for the cryptocurrency Bitcoin. More recently, with the emergence of the second-generation blockchain represented by Ethereum, the technology has also been adopted as a trustworthy storage and computation solution for more general data, such as text, documents, and images. However, due to the high cost of maintaining blockchain ledgers, storing the raw data on-chain would lead to low scalability, which does not fit in with the big data paradigm. To scale up the services, prior research has suggested a hybrid storage architecture, where only small meta-data is stored on-chain and the raw data is outsourced to an off-chain storage server (e.g., Amazon S3 or Google Cloud Storage). As shown in FIG. 1, the data owners (e.g., IoT devices) continuously send the data to the blockchain for secure storage. To protect data integrity, the on-chain meta-data can be used to verify the data retrieved from the off-chain storage server. Nevertheless, the existing schemes can support exact-matching retrieval only, but general searches are not supported.

In making this invention, efficient blockchain searches with integrity assurance were explored. Inspired by authenticated query processing in outsourced databases, an intuitive approach is to leverage the smart contract to construct an authenticated data structure (ADS, e.g., Merkle hash tree) on top of the search keys in the blockchain. The smart contract is a trusted program running on the top of the blockchain, which execution integrity is ensured by the consensus protocol of the blockchain. Meanwhile, a similar ADS is maintained by the cloud service provider. Based on the ADS, a verification object (VO) can be generated for each query and returned along with the result. Using the VO, the client is able to verify whether or not the query result is both sound and complete. Here, soundness means that all of the answers satisfy the query condition and truly originate from the data owners, and completeness means that no valid answer is missing.

The major challenge of the above approach comes from data updates. To keep track of the updates, the ADS needs to be dynamically maintained by the smart contract. In a smart contract-enabled blockchain like Ethereum, users need to pay gas (a fee or pricing value required to successfully conduct a transaction or execute a task) for storage and computation as the smart contract execution costs the miner's resources. The amount of gas to pay for different operations differs. Notably, the gas charged for a smart contract write operation is several orders of magnitude higher than that for a read operation (e.g., 20,000 vs. 200 in Ethereum). Thus, if simply a full Merkle tree is maintained as the ADS, the update cost would be prohibitively high. The reason is threefold: (i) an insertion may incur a series of updates in the leaf node to preserve the order of the data; (ii) an insertion entails updating the hashes of all ancestor nodes; (iii) an insertion may lead to recursive node splits, which consume lots of storage and computation for the creation of new nodes and redistribution of index keys. As such, novel ADSs that allow efficient updates in terms of the gas cost are needed.

Figure 2:
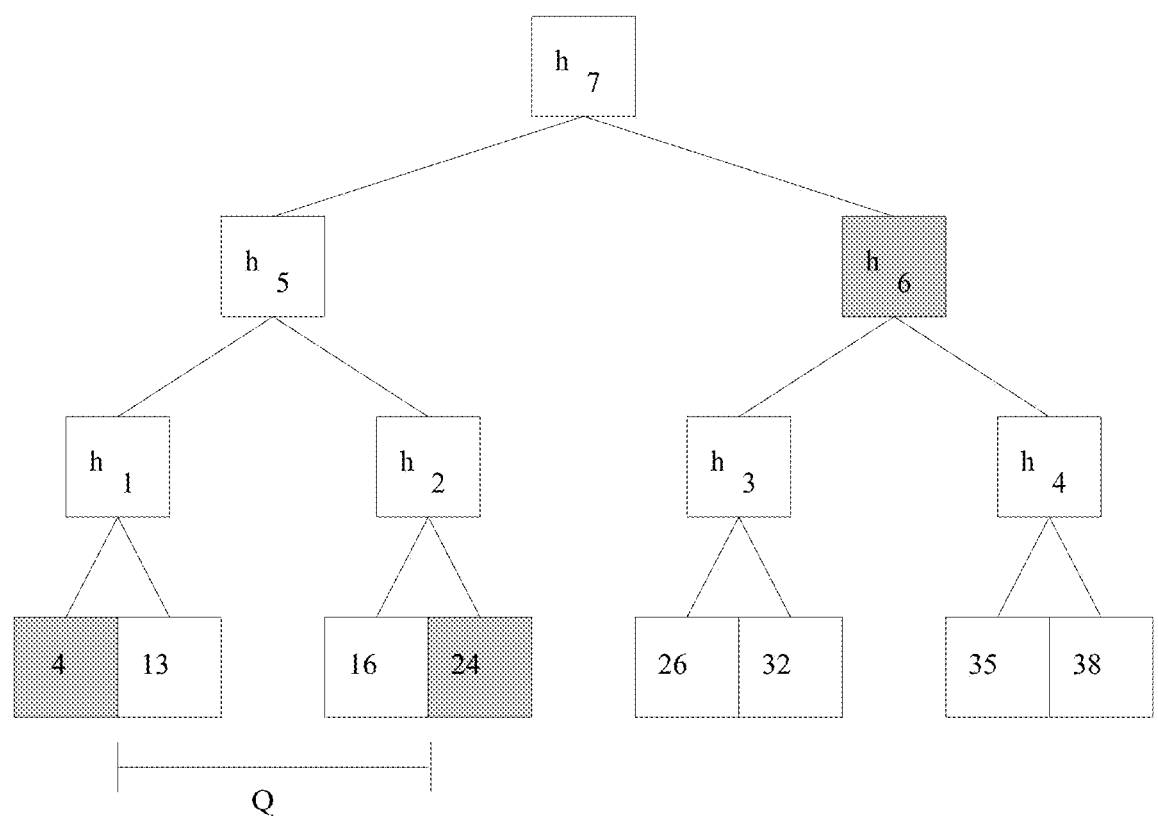
FIG. 2 shows a merkle hash tree diagram.

To this end, a new ADS, called Gas-Efficient Merkle Merge Tree ($GEM^2$-tree), that can be efficiently maintained in the blockchain while being effective in supporting integrity-assured range queries is provided. In FIG. 2, for clarity, the search key value is simply used to denote the hash of an object. The main idea of the $GEM^2$-tree is to trade writes for reads and computations. On the one hand, a single full-tree structure is not maintained in the blockchain, but multiple partial trees that can be gracefully merged with more objects inserted. This helps to reduce the update costs, although more reads will be incurred for query authentication. On the other hand, some internal nodes of the $GEM^2$-tree are suppressed and computed on the fly to maintain the root hashes, which are needed for result verification. In this way, update costs are reduced at the expense of more computations. To further reduce the ADS maintenance cost, an optimized ADS, called $GEM^{2*}$-tree, is provided. This extends the $GEM^2$-tree with an upper-level index that splits the search key domain into several non-overlapping subspaces.

To summarize, this invention's contributions are as follows:
  For the first time, solutions to the problems of integrity-assured range queries in the hybrid-storage blockchain are provided.
  The proposed method allows end users to verify the correctness of the related search results, thus extending the data integrity from blockchain nodes to end users.
  A gas-efficient ADS, called $GEM^2$-tree that is optimized to minimize the blockchain maintenance cost by reducing expensive write operations is provided.
  An optimized ADS, $GEM^{2*}$-tree, which can further reduce the maintenance cost without sacrificing much the query performance is provided.
  Theoretical analysis and empirical evaluation are conducted to validate the performance of the proposed ADSs. Experimental results show that the proposed ADSs, in comparison with the traditional methods, can reduce the gas cost by a factor of up to 4 with little penalty on the query performance.

Preliminaries

In this section, some preliminaries are provided that will be used in the subsequent sections.

A. Cryptography Primitives

Cryptographic Hash Function: A cryptographic hash function $h(\cdot)$ maps an arbitrary-length message m to a fixed-length message digest $h(m)$. It has two important properties: one-way and collision resistance. The one-way property indicates that given a digest $h(m)$, a PPT adversary can find the original message m with a negligible probability. On the other hand, collision resistance means that it is computationally infeasible for a PPT adversary to find two different messages $m_1$ and $m_2$ such that $h(m_1)=h(m_2)$.

Merkle Hash Tree: A Merkle Hash Tree (MHT) is a data structure that can be used to authenticate a set of data objects with logarithmic time complexity. It is widely used in authenticated queries and also in the blockchain structure. FIG. 2 shows an example of an MHT with eight data objects. Generally, the MHT is a binary tree constructed bottom-up. Each leaf node contains the hashes of the indexed objects. Each internal node contains a hash which is computed using its two child nodes (e.g., $h_5=h(h_1\|h_2)$, where "$\|$" denotes string concatenation). Owing to the collision resistance property of the hash function, the root hash (i.e., $h_7$ in FIG. 2) can be used to authenticate the data objects stored in the leaf nodes. For example, if a range query $Q=[10, 20]$ is asked, the result is $\{13, 16\}$, and one can construct a proof consisting of $\{4, 24, h_6\}$ (shaded part in FIG. 2). A verifier can reconstruct the root hash using the result and proof, and further compare it with the signed root hash, which is publicly available. If they match, it means the result has not been tampered with. Furthermore, the boundary objects 4 and 24 guarantee the completeness of the result.

The MHT concept has been extended to various database indexes to suit different query applications. The Merkle B-tree (or MB-tree) is one of such examples, which combines B-tree and MHT to support authenticated queries for outsourced relational databases. While the structure of MB-tree is based on the traditional B-tree, like MHT, each index entry of MB-tree is augmented with a corresponding hash. MB-tree can be seen as a generalized MHT in which the fan-out of the tree is increased from binary to m-ary.

TABLE 1

Ethereum Gas Cost

| Operation | Gas Used | Explanation |
|---|---|---|
| $C_{sload}$ | 200 | load a word from storage |
| $C_{sstore}$ | 20,000 | store a word to storage |
| $C_{supdate}$ | 5,000 | update a word to storage |
| $C_{mem}$ | 3 | access a word in memory |
| $C_{hash}$ | 30 + 6·|words| | hash an arbitrary-length data |

B. Blockchain and Smart Contract

Figure 3:
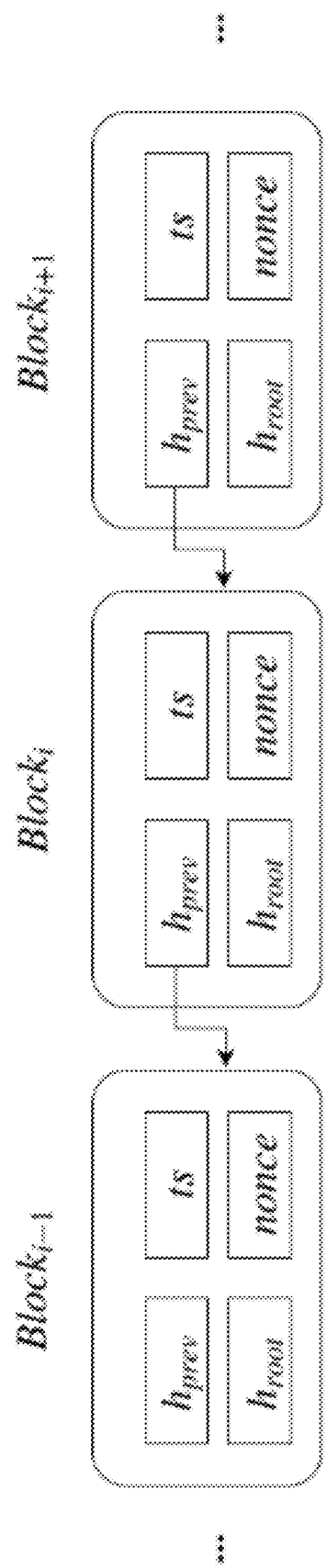
FIG. 3 shows the blockchain structure.

A blockchain comprises a series of blocks chained by cryptographic hash pointers (see FIG. 3). Each block stores a list of transaction records and an MHT is built on top of the transaction records. The header of a block contains a cryptographic hash of the previous block $h_{prev}$, a timestamp ts, an MHT root hash $h_{root}$, and a consensus-proof nonce that is found by consensus peers (known as miners). To append a new block to the blockchain, a miner needs to find a qualified nonce and broadcast it to the entire network. In the Proof of Work (PoW) consensus protocol, nonce should satisfy $h(ts|h_{prev}|h_{root}|nonce)<D$, where D is a small value used to control the difficulty level of the mining process. Upon receiving a new block, other miners verify the hashes and the nonce and, once verified, add the new block to the blockchain. The blockchain protocol ensures that each peer keeps the same replicas of the data and the stored data are immutable.

A smart contract is a trusted program that allows users to process data in the blockchain. The program is executed by the miners and its correctness is guaranteed by the blockchain consensus protocol. A deployed contract can be triggered by the transactions recorded in the blockchain. During execution, a transaction fee, denominated in gas, is charged as the miners spend computational resources. Table 1 shows the fees for some major storage and computation operations in the Ethereum platform. As can be seen, the operation of storing data to the blockchain is more expensive than that of updating data, which is itself more costly than reading data from the blockchain and the in-memory operations. Furthermore, to prevent a smart contract from wasting too many computation resources of the miners, a gasLimit (e.g., 8,000,000 in Ethereum) is introduced. If the total gas consumption exceeds the gasLimit, the execution will be aborted. As such, it is of the utmost importance to minimize the gas consumption.

Problem Formulation

A. Apparatus Model

As shown in FIG. 1, an apparatus in accordance to various embodiments of the present invention comprises four parties: data owners (DO), a blockchain with smart contract functionality, a cloud service provider (SP), and query clients. The DO can generate the data from time to time. The data which is generated by the DO can be modeled as a tuple $o_i=<k_i, v_i>$, where $k_i$ is the value of the search key and $v_i$ denotes the rest of the data object. During the data insertions or updates, the DO sends the raw data $o_i=<k_i, v_i>$ to the SP and also sends a blockchain transaction which contains the information of $<k_i, h(v_i)>$. Note that as the blockchain is used for query authentication, the hash value $h(v_i)$, rather than $v_i$ itself, is stored in the blockchain. This can help reduce the storage cost without compromising the guarantee of integrity.

To facilitate authenticated query processing and result verification, an authenticated data structure (ADS) should be maintained by both the SP and the smart contract of the blockchain. Upon receiving a data insertion or data update transaction, the smart contract is triggered to update the ADS in the blockchain. Specifically, the miners of the blockchain network verify the authenticity of the insertion or update transaction and then execute the ADS maintenance algorithms using the digest. Then the blockchain network synchronizes the new index obtained from the miners and verifies their correctness through the blockchain consensus protocol. Meanwhile, the ADS in the SP is updated accordingly. The digest of the ADS becomes authenticated information that is shared by both the SP and the smart contract.

One main focus of this invention is the range queries. The query processing procedure is as follows. The client sends a query to the SP, which uses the ADS to compute the query result as well as a verification object ($VO_{sp}$) that contains the information for the client to verify the result. Both the query result and the VO are returned to the client. During result verification, the client first retrieves the authenticated digest (hereafter denoted $VO_{chain}$) from the blockchain. Then, by combining the $VO_{sp}$ from the SP and the $VO_{chain}$ from the blockchain, the client can verify the correctness of the returned result.

The apparatus is a collection of the following polynomial-time algorithms, where DataUpload($o_i$=⟨$k_i$, $v_i$≤⟩)→{$o_i$, $o'_i$}: is run by the data owner. It takes an object as an input and then computes the collision-resistant hash of the data value. The object $o_i$ is sent to the service provider SP and the hashed $o'_i$=⟨$k_i$, $h(v_i)$⟩ is included in a blockchain transaction and sent to the blockchain network.

DataInsertionContract($T_{chain}$, $o'_i$)→{$T'_{chain}$}: is run by the smart contract. It takes the previous version of the ADS $T_{chain}$ and also the object with the hashed value as inputs and the algorithm outputs the ADS $T'_{chain}$ after the insertion. The miners of the blockchain network execute this algorithm according to the consensus protocol and then the final state of the ADS will be synchronized.

DataInsertionSP($T_{sp}$, $o_i$)→{$T'_{sp}$}: is run by the service provider after the consensus confirmation of the DataInsertionContract algorithm. It takes the input of the previous version of the ADS $T_{sp}$ and also the raw object $o_i$ and outputs the new ADS $T'_{sp}$.

DataUpdateContract($T_{chain}$, $o'_i$)→{$T'_{chain}$}: is run by the smart contract. It takes the previous version of the ADS $T_{chain}$ and also the hashed object with the existing search key $k_i$. The output is the updated version of the ADS $T'_{chain}$.

DataUpdateSP($T_{sp}$, $o_i$)→{$T'_{sp}$}: is run by the service provider after the consensus confirmation of the DataUpdateContract algorithm. It takes the input of the previous version of the ADS $T_{sp}$ and also the raw object $o_i$ with the existing search key $k_i$ and outputs the updated ADS $T'_{sp}$.

DataDeleteContract($T_{chain}$, $k_i$)→{$T'_{chain}$}: is run by the smart contract. It takes the previous version of the ADS $T_{chain}$ and also an existing search key $k_i$. The output is the updated version of the ADS $T'_{chain}$.

DataDeleteSP($T_{sp}$, $k_i$)→{$T'_{sp}$}: is run by the service provider after the consensus confirmation of the DataDeleteContract algorithm. It takes the input of the previous version of the ADS $T_{sp}$ and also an existing search key $k_i$ and outputs the updated ADS $T'_{sp}$.

AuthQuery(Q, $T_{sp}$)→{R, $VO_{sp}$}: is run by the service provider for computing the range query request Q from the client. The input contains both the query Q and the ADS $T_{sp}$. The algorithm outputs the result R and the $VO_{sp}$ for verifying the soundness and completeness of the result R.

ResultVerify(Q, R, $VO_{sp}$, $VO_{chain}$)→{b}: is run by the client which takes the input of the query Q, the result R received from the service provider, the verification object $VO_{sp}$ received from the service provider, the verification object $VO_{chain}$ downloaded from the blockchain network and verified by the consensus protocol. The algorithm outputs a bit b represent an accept or reject result.

B. Threat Model

In the model of the present invention's various embodiments, the DO, the blockchain, and the query client are assumed to be trusted parties. The third-party SP is seen as an untrusted party since it may modify, add, or delete data intentionally or unintentionally. Therefore, the SP is required to prove the soundness and completeness of the query result:

Soundness—all of the answers in the result satisfy the query criteria and are originated from the DO; and Completeness—no valid answer is missing from the query result.

With the above apparatus model and threat model, the problem being solved by this invention is how to design an ADS that can be efficiently maintained by a smart contract, in terms of the gas cost, while effectively supporting authenticated range queries. In the following sections, two baseline solutions are presented followed by a novel gas-efficient ADS.

Baseline Solutions

In accordance to an embodiment of the present invention, two baseline solutions are provided, namely Merkle B-tree (MB-tree) and Suppressed Merkle B-tree (SMB-tree). The general approach of the baseline solutions is that the SP and the blockchain both maintain a version of MB-tree to support authenticated queries over the hybrid-storage blockchain.

A. Merkle B-Tree (MB-Tree)

As introduced in the above PRELIMINARIES section, the MB-tree can be used to authenticate range queries. Thus, intuitively, two identical MB-trees can be constructed and maintained as ADS by the SP and the smart contract of the blockchain, respectively, except that the actual data objects are not stored in the blockchain. On the SP side, whenever there is a query from the client, the SP can traverse the MB-tree to construct a $VO_{sp}$. For example, in FIG. 2, given a query Q=[10, 20], $VO_{sp}$={4, 24, $h_6$}. For result verification, the client first retrieves the authenticated digest $VO_{chain}$=$h_7$ from the blockchain. Then the MB-tree root is reconstructed locally using the result {13, 16} and $VO_{sp}$. Since the MB-trees maintained by the blockchain and the SP are identical, the client can establish the soundness of the result by checking the reconstructed root hash against the one retrieved from the blockchain (i.e., $VO_{chain}$).

Next, an analysis is conducted on the maintenance cost of the MB-tree in the blockchain. For the sake of simplicity, the case of inserting a single object is considered. To optimize the gas cost, it is assumed that the MB-tree's node capacity is the same as the granularity of blockchain data access. Suppose that the fan-out of the MB-tree is F and the current database size is N. First, an object insertion requires finding the leaf node to store the object, which consumes $\log_F N \cdot C_{sload}$ gas. The inserted object costs an additional $C_{sstore}$ gas. Second, an object insertion demands hash updating of $\log_F N$ ancestor nodes, each one requiring $F \cdot C_{sload} + C_{hash} + C_{supdate}$ gas. Furthermore, in the worst case, an object insertion could result in $O(\log_F N)$ node splits to maintain balanced tree structure. In each node split, a new node will be created along with the key redistribution and the updating of the nodes' hash values. A node creation consumes $2C_{sstore}$ gas for storage of the node's content and hash, whereas the rest of the operations contribute to $F \cdot C_{sload} + C_{supdate}$ gas consumption. In total, a single object will yield the following gas cost in the worst case:

$$C_{MB-tree}^{insert} = \log_F N(2C_{sstore} + 2C_{supdate} + (2F+1)C_{sload} + C_{hash}) + C_{sstore} \qquad \text{Eq. (1)}$$

It can be observed that the cost increases logarithmically with the database size N. It is also worth noting that among all smart contract operations, $C_{sstore}$ and $C_{supdate}$ are more expensive than the others (see Table 1).

B. Suppressed Merkle B-Tree (SMB-Tree)

The maintenance of the MB-tree in the blockchain would incur a large amount of gas consumption due to the extensive write operations (i.e., sstore and supdate). At the same time, it can be observed that only the root hash $VO_{chain}$ is used during the query processing. Therefore, an alternative solution is to suppress all nodes of the MB-tree and only materialize the root node in the blockchain. This structure is called Suppressed Merkle B-tree (SMB-tree). During each object insertion, the smart contract will compute all nodes of the SMB-tree on the fly and only update the root hash to the blockchain storage. Note that the MB-tree in the SP is maintained in the same way but not suppressed.

Similar to the MB-tree, the gas cost for a single object insertion is analyzed. The first step of the smart contract is to load all data into the memory from the blockchain storage. This step incurs $N \cdot C_{sload}$ gas consumption. Next, the loaded objects are sorted, which requires $N \log N \cdot C_{mem}$ gas. Once the objects are sorted, the smart contract can compute all the MB-tree hashes on the fly with $N/F \cdot C_{hash}$ gas. Finally, the inserted object and the updated root hash are written into the blockchain storage, which incurs an additional $C_{sstore} + C_{supdate}$ cost. In total, the SMB-tree involves the following gas cost for each object insertion:

$$C_{SMB\text{-}tree}^{insert} = N\left(C_{sload} + \log N \cdot C_{mem} + \frac{1}{F}C_{hash}\right) + C_{sstore} + C_{supdate} \quad \text{Eq. (2)}$$

Compared with the normal MB-tree, the SMB-tree yields a gas cost in the complexity of $O(N \log N)$ with respect to the database size. Nevertheless, because the read operation (i.e., sload) and the in-memory operations (e.g., mem and hash) are several orders of magnitude cheaper than the write operations, the SMB-tree has the potential to reduce gas consumption for a small to medium N. On the other hand, $C_{SMB\text{-}tree}$ will surpass $C_{MB\text{-}tree}$ with a sufficiently large N.

C. ADS Design Principles

Based on the cost analysis of the baseline solutions, the following principles were considered in designing an optimized ADS which is efficient in both maintenance and query authentication.

Avoid maintaining long sorted lists. The insertion of an N-length sorted list costs $N/2 \cdot C_{supdate}$ gas on average. The high update cost will weaken the performance when database size increases.

Use more reads instead of writes. The write cost in the blockchain is much higher than the read cost due to the consensus protocol. Thus, for intermediate variables, they may be computed in the memory and only the final computation result is maintained in the blockchain to reduce the storage cost.

Be adaptable to databases of different sizes. The database size has an impact on the maintenance performance of an ADS. An ideal ADS should be able to adapt itself to the database size.

Gas-Efficient Merkle Merge Tree

Following the above design principles, a new ADS, called Gas-Efficient Merkle Merge Tree (GEM$^2$-tree), is proposed. The GEM$^2$-tree not only can be maintained by the smart contract with optimized gas performance, but is also capable to support authenticated queries efficiently.

A. GEM$^2$-Tree Structure

As discussed in the BASELINE SOLUTIONS section, the MB-tree and SMB-tree are efficient for large databases and small databases, respectively. Thus, in the GEM$^2$-tree, multiple separate structures are maintained: a large fully-structured MB-tree as the major index and a series of small structure-suppressed SMB-trees to index newly inserted objects. The benefit is twofold. On the one hand, a new object can always be inserted into the smaller SMB-trees, which is more gas-efficient. On the other hand, the objects indexed by the SMB-trees can be merged into the MB-tree in batch to optimize the update cost. The MB-tree structure is the same as that introduced in the BASELINE SOLUTIONS—A. Merkle B-tree (MB-tree) section except that it is maintained by batched updates via merge operations (to be detailed in the GAS-EFFICIENT MERKLE MERGE TREE—B. GEM$^2$-tree Maintenance section).

Regarding the structure-suppressed SMB-trees, recall that the internal structure of an SMB-tree needs to be re-built for each object insertion, in order to update the root hash. Thus, to reduce the update cost, the storage space is organized into a set of exponentially-sized partitions. For each partition, up to two SMB-trees are maintained and they can be gracefully merged with more insertions. Note that the partitions are logical in the sense that they will dynamically change along with merges. This design has several advantages. First, as new object insertions can be directed to the smallest partition, less data need to be read and computed during the root hash update. Second, there is no need to physically re-arrange the objects after they are written into the storage, which is critical to save the gas cost. Third, this also significantly saves the maintenance cost on the SP side as it does not need to rebuild the tree structure over the entire dataset for each object insertion. Fourth, this ensures that the total number of partitions is $O(\log N)$, which will benefit the query processing.

Figure 4:
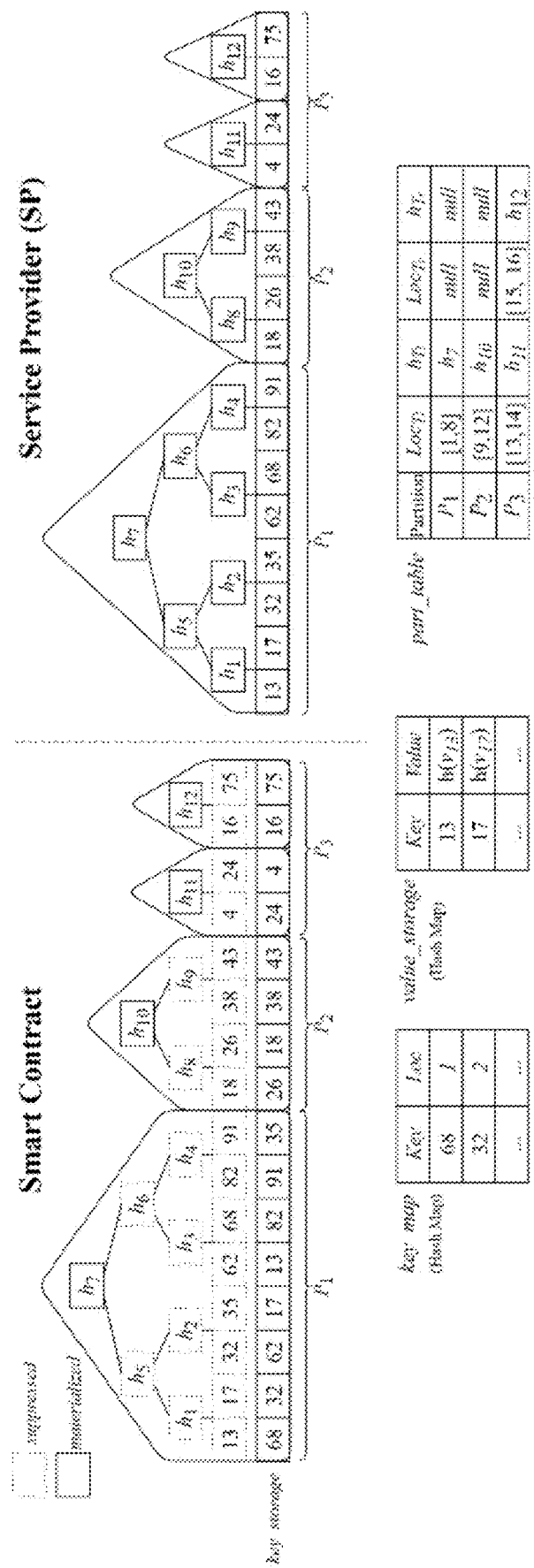
FIG. 4 shows the overall structure of a GEM²-tree with hybrid storage.

FIG. 4 shows an example of the GEM$^2$-tree, where the fully-structured MB-tree is omitted for clarity. Besides key storage and value storage. As explained in the previously section, only the search keys and hashes of the objects are stored in the blockchain. The objects and object hashes are not distinguished when the context is clear. The GEM$^2$-tree comprises the following components: (i) a set of SMB-trees, one or two for each partition; (ii) an auxiliary partition index table (denoted as part table); and (iii) a mapping between search key and storage location (denoted as key map). The first two components are shared between the blockchain and the SP, while the last one is present only in the blockchain. It is worth noting that the search keys in the blockchain remain unsorted to reduce the gas cost; they are essentially stored in the order of insertions. Also, while the SMB-tree structures are suppressed in the blockchain, they are fully materialized on the SP side to support efficient query processing. The purpose of the part table is to track how the storage space is partitioned. For each partition, up to two SMB-trees (denoted as $T_l$ and $T_r$, respectively) can be maintained. The part table keeps the following information for each SMB-tree in each partition: (i) the storage location range (Loc) and (ii) the root hash (h). For example, in FIG. 4, $T_l$ in $P_1$ corresponds to the objects stored in locations [1-8], $T_r$ in $P_1$ is empty; in $P_3$, $T_l$ and $T_r$ correspond to the objects stored in locations [13-14] and [15-16], respectively. Here, the root hash is slightly different from the normal MB-tree as the key boundaries are also encoded into it. For example, in FIG. 4, the root hash for tree $T_l$ in $P_1$ is $h_7 = h(13 \| 91 \| h(h_5 \| h_6))$. The extra boundary information can help the SP to prune the entire tree during the query processing, and thus improve the query performance. Finally, the key map maintains an index of the storage location for each search key. It will be used during the update, to be explained in the next section.

---

Algorithm 1 GEM$^2$-Tree Insert(key, value)

Input Search key key, Data value value
1: loc ← key_storage.length + 1;
2: key_map[key] ← loc;
3: key_storage[loc] ← key;
4: value_storage[key] ← h(value);
5: if $P_{max}$ = null then
6:    $P_{max}.Loc_{T_l}$ ← [1,M];
7:    $P_{max}.Loc_{T_r}$ ← [M + 1,2M];
8: if loc ∈ $P_{max}.Loc_{T_l}$ then
9:    $P_{max}.T_l$ ← BuildSMBTree($P_{max}.Loc_{T_l}$);
10: else if loc ∈ $P_{max}.Loc_{T_r}$ then
11:    $P_{max}.T_r$ ← BuildSMBTree($P_{max}.Loc_{T_r}$);
12: else
13:    ret ← Merge($P_{max}$);
14:    if ret = true then max ← max + 1;
15:    $P_{max}.Loc_{T_l}$ ← [loc,loc + M − 1];
16:    $P_{max}.Loc_{T_r}$ ← [loc + M,loc + 2M − 1];
17:    $P_{max}.T_l$ ← BuildSMBTree($P_{max}.Loc_{T_l}$);

---

B. GEM$^2$-Tree Maintenance

There are three maintenance operations for the GEM$^2$-tree: (i) insertion; (ii) updating; (iii) deletion. The deletion operation can be seen as updating the data object with a dummy one. Therefore, the focus is on the insertion and updating operations only. For ease of illustration, it is denoted that the partition for the fully-structured MB-tree as $P_0$ and the rest of partitions as $P_1, P_2, \ldots, P_{max}$. Let M be the maximum size of the smallest SMB-tree, i.e., the one in $P_{max}$. The size of each partition is thus b1·2 max−1·M, . . . , b max−2·4M, b max−1·2M, b max·M, where $b_i$ is 1 or 2 depending on the number of SMB-trees existing in $P_i$.

Insertion. Algorithm 1 describes the insertion procedure. Whenever a new object arrives, it will be directed to the partition $P_{max}$. If the partition is not full (i.e., its size is less than 2M), the object will be simply inserted into the current SMB-tree (lines 1-11). Otherwise, if the partition is full, a new SMB-tree is created with the object and a merge process is invoked to merge the two existing SMB-trees into a bigger SMB-tree of size 2M, which will then be assigned to the preceding partition $P_{max-1}$ (lines 13-17). If max−1 is less than one, it means the corresponding partition does not exist yet. Thus, it is required to increment max and create a new partition (line 14). The merge process is detailed in Algorithm 2. It may take place recursively if the current partition is full and needs to make room for the newly merged SMB-tree. To avoid maintaining too many objects in a single SMB-tree that incurs high maintenance cost as discussed in the Suppressed Merkle B-tree (SMB-tree) section, an upper bound, $S_{max}$, is set on the SMB-tree size. If the size of each SMB-tree to be merged exceeds $S_{max}/2$, instead of merging them, they will be bulk inserted into the fully-structured MB-tree $P_0$. This insertion procedure is the same for the smart contract and the SP except two differences: (i) instead of value, h(value) is stored in the blockchain; (ii) the construction of the SMB-trees in the smart contract, with internal nodes suppressed and key values unsorted, is carried out on the fly.

---

Algorithm 2 GEM$^2$-Tree Merge($P_i$)

Input Partition $P_i$
Output Whether to increment max flag ret
1: if i = 1 then
2:   if $P_1$.length < $S_{max}$ then
3:     $P_1.Loc_{T_l}$ ← $P_1.Loc_{T_l}$ ∪ $P_1.Loc_{T_r}$;
4:     $P_1.T_l$ ← BuildSMBTree($P_1.Loc_{T_l}$);
5:     Empty $P_1.T_r$; ret ← true;
6:   else
7:     Bulk insert the data in $P_1$ to $P_0$;
8:     Empty $P_1$; ret ← false;
9: else if $P_{i-1}.T_r$ = null then
10:   $P_{i-1}.Loc_{T_r}$ ← $P_i.Loc_{T_l}$ ∪ $P_i.Loc_{T_r}$;
11:   $P_{i-1}.T_r$ ← BuildSMBTree($P_{i-1}.Loc_{T_r}$);
12:   Empty $P_i$; ret ← false;
13: else
14:   ret ← Merge(i − 1);
15:   if ret = true then
16:     $P_i.Loc_{T_l}$ ← $P_i.Loc_{T_l}$ ∪ $P_i.Loc_{T_r}$;
17:     $P_i.T_l$ ← BuildSMBTree($P_i.Loc_{T_l}$);
18:     Empty $P_i.T_r$; ret ← true;
19:   else
20:     $P_{i-1}.Loc_{T_l}$ ← $P_i.Loc_{T_l}$ ∪ $P_i.Loc_{T_r}$;
21:     $P_{i-1}.T_l$ ← BuildSMBTree($P_{i-1}.Loc_{T_l}$);
22:     Empty $P_i$; ret ← false;
23: return ret;

---

Algorithm 3 GEM$^2$-Tree Update(key, value)

Input Search key key, Update value value
1: value_storage[key] ← h(value);
2: loc ← key_map[key];
3: p ← LocatePartition(loc,max);
4: if p = 0 then
5:   Update MB-tree $P_0$ using (key,value);
6: else
7:   if loc ∈ $P_p.Loc_{T_l}$ then
8:     $P_p.T_l$ ← BuildSMBTree($P_p.Loc_{T_l}$);
9:   else
10:     $P_p.T_r$ ← BuildSMBTree($P_p.Loc_{T_r}$);

---

Algorithm 4 LocatePartition(loc, max)

Input Storage location loc, # partitions max
Output Partition index p
1: p ← max;
2: [max_start,max_end] ← $P_{max}.Loc_{T_r}$;
3: len ← max_end; cap ← 2M;
4: while p > 0 do
5:   if len mod cap = 0 then   ▷ There are two SMB-trees
6:     if loc ∈ [len − cap + 1,len] then return p;
7:     len ← len − cap;
8:   else   ▷ There is only one SMB-tree
9:     if loc ∈ [len − cap/2 + 1,len] then return p;
10:     len ← len − cap/2;
11:   p ← p − 1; cap ← 2 · cap;
12: return 0;

---

Updating. In contrast to the insertion operation, the updating operation replaces the value of an existing key with a new value. In this scenario, the GEM$^2$-tree structure remains unchanged. It is only required to locate the corresponding partition for the updated object and recompute the root hash of the corresponding MB-tree or SMB-tree. The procedure is described in Algorithm 3. Recall that a nice property of the GEM$^2$-tree is that the storage location of each search key is fixed once it is stored in the blockchain, while the (logical) partitions will dynamically change with subsequent insertions and merges. Thus, the storage location of the search key is first identified by checking the key map (line 2). Then, the function, LocatePartition, is invoked with the storage location to identify the partition that contains the search key (line 3). After that, the corresponding tree is updated (lines 4-10).

---

Algorithm 5 Authenticated Query with GEM²-tree (by SP)

---

Input Query range Q, GEM²-tree $\mathcal{T}$
Output Query result R, Verification object $VO_{sp}$
1:   $(r_0, vo_0) \leftarrow$ MBTreeRangeQuery$(Q, P_0.T)$;
2:   Append $r_0$ to R and $vo_0$ to $VO_{sp}$;
3:   for each $P_i$ in $\mathcal{T}$ part_table do
4:     $(r_i.l, vo_i.l) \leftarrow$ MBTreeRangeQuery$(Q, P_i.T_l)$;
5:     $(r_i.r, vo_i.r) \leftarrow$ MBTreeRangeQuery$(Q, P_i.T_r)$;
6:     Append $\langle r_i.l, r_i.r \rangle$ to R, $\langle vo_i.l, vo_i.r \rangle$ to $VO_{sp}$;
7:   return $\langle R, VO_{sp} \rangle$;

---

To implement the function LocatePartition, the simplest way is to check the part table since it records the location range of each partition. However, this method is gas-inefficient as the whole table may need to be accessed in the worst case. To reduce the gas cost, a more efficient algorithm is provided that only needs to access the partition $P_{max}$. As detailed in Algorithm 4, after retrieving the location range of $P_{max}$, the partition from $P_{max}$ to $P_1$ is searched with respect to the maximum capacity of each partition. Since not all partitions contain two SMB-trees, a mod operation is employed to check whether or not the current partition contains two SMB-trees. If so, the mod result must be zero. For example, in FIG. 4, it is supposed to identify the partition for location 9. The initial space length is 16 and the maximum capacity of $P_3$ is 4, by checking 16 mod 4=0, it is noticed that $P_3$ has two SMB-trees and hence spans from location 13 to 16. So location 9 is not in $P_3$. Next, the space length is reduced to 12 and then $P_2$ is checked, whose maximum capacity is 8. By checking 12 mod 8≠0, $P_2$ has only a single SMB-tree and thus spans from location 9 to 12. Hence, it is possible to identify that location 9 is in $P_2$. If the location is not found in any SMB-tree partition, then it can be concluded that it resides in the fully-structured MB-tree $P_0$.

Figure 5:
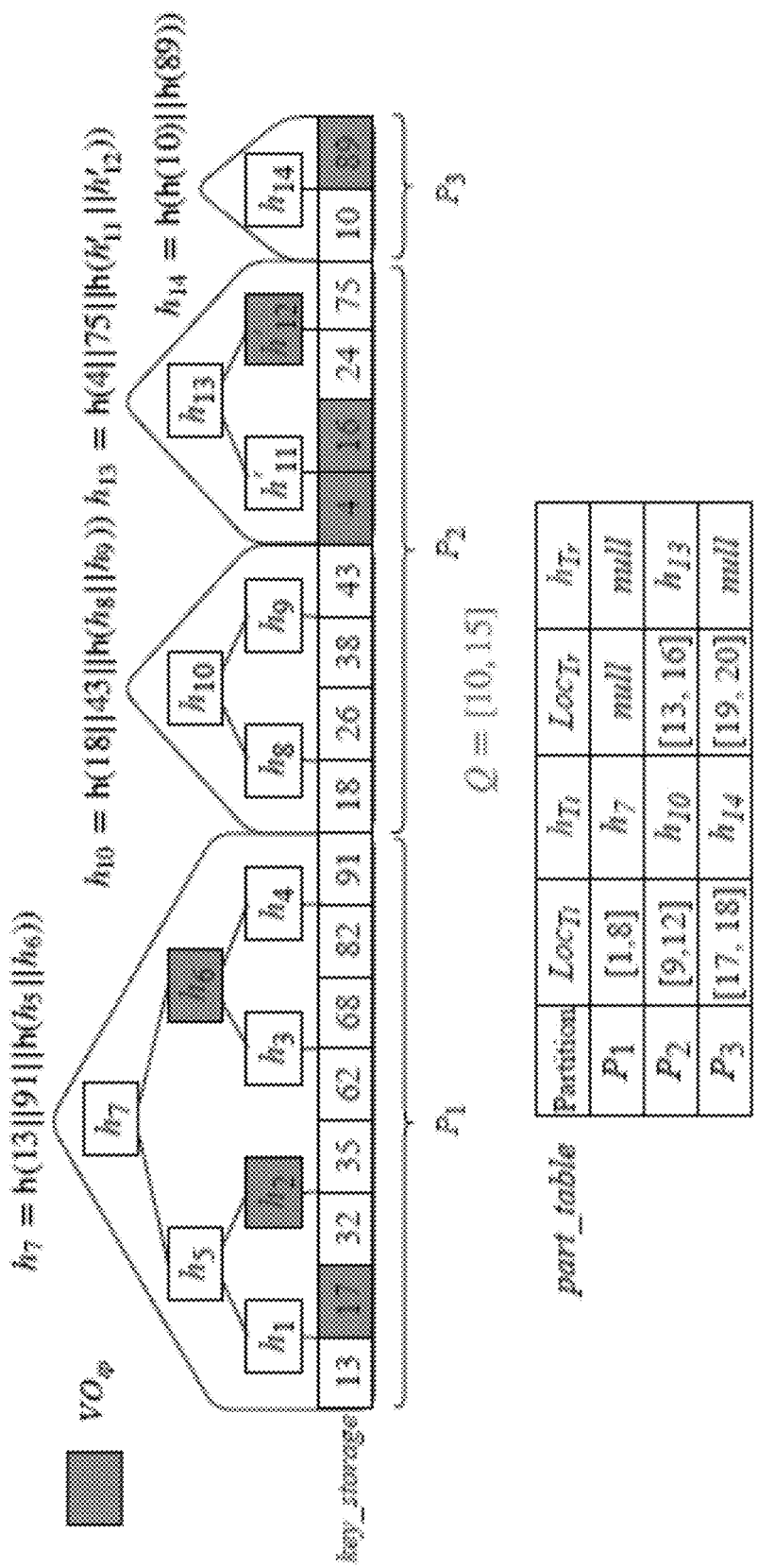
FIG. 5 shows the GEM²-tree in the Service Provider after insertion.

Example. FIG. 4 and FIG. 5 are used as an example to illustrate the maintenance of GEM²-tree. Suppose one wants to insert two new keys 10 and 89 into the GEM²-tree shown in FIG. 4. First, for the key 10, it is found that the smallest partition $P_3$ is full. Therefore, a new SMB-tree containing the key 10 is created. Meanwhile, the two existing SMB-trees of $P_3$ are merged into the preceding partition $P_2$. Since $P_2$'s right SMB-tree $T_r$ is empty, the merged tree will be put there and $P_2$'s location range is extended. Next, for the key 89, it is simply inserted into the SMB-tree in the new $P_3$ since it is not full. As for data updates, suppose if the value of the key 26 is updated, the key map is checked and the function LocatePartition to locate its partition $P_2$ is invoked. After that, the value is updated and the corresponding root hash is updated by reconstructing the SMB-tree with the updated value.

---

Algorithm 6 Result Verification with GEM²-tree (by Client)

---

Input Query range Q, Query result R, $VO_{sp}$ from the SP, $VO_{chain}$ form the blockchain
Output Whether the verification is passed
1:   Verify $VO_{chain}$ w.r.t. the blockchain;
2:   for $\langle r_i, vo_i \rangle$ in Q, R do
3:     $T_i \leftarrow$ MB-tree root from $VO_{chain}$ w.r.t. $\langle r_i, vo_i \rangle$;
4:     stat $\leftarrow$ MBTreeVerify$(r_i, vo_i, T_i)$;
5:     if stat = false then return false;
6:   return true;

---

C. Authenticated Query Processing

This section describes how to process authenticated queries over the hybrid-storage blockchain with their proposed GEM²-tree. In the range query scenario, the client submits a query range Q=[lb,ub]. In turn, the SP returns all the objects lying in the range [lb,ub], together with the proof $VO_{sp}$. Since the GEM²-tree consists of one normal MB-tree and multiple SMB-trees, with each of them perhaps contributing to the query result, the SP is required to traverse all these trees and process the range query on them individually. After that, the SP combines the result objects and VO for each of these trees to generate the final query result and $VO_{sp}$. The overall query processing procedure on the SP side is presented in Algorithm 5. First, MBTreeRangeQuery is invoked for the fully-structured MB-tree corresponding to the $P_0$ partition (lines 1-2). Then, it is invoked for both the left and right SMB-trees of each remaining partition (lines 3-6).

The MB-Tree Range Query procedure is similar to that of the normal MB-tree range query. First, the SP checks whether or not the query range overlaps with the boundaries of the current tree root. If there is no overlap, it means that the current tree does not contribute to the query result. In this case, the tree root hash, which encodes the boundary information, can be used directly as the VO and the procedure is terminated. Otherwise if they overlap, the range query can be executed as a breadth-first search. Starting from the root node, if a non-leaf node intersects the query range, it will be branched with its subtree further explored; if a non-leaf node has no intersection with the query range, its hash will be added as part of the VO. When a leaf node is reached, the SP will check each underlying object. The objects which fall inside the query range will be added to the query result, while the hashes of the other objects will be appended to the VO. Note that the boundary search keys $r_{lb}^-$ and $r_{ub}^+$, which are immediately outside the query range, should also be included in the VO to prove the completeness.

On the client side, the verification process is composed of two steps, namely retrieving $VO_{chain}$ and result verification. During the $VO_{chain}$ retrieval, the client retrieves from the blockchain the Merkle roots of all the trees in the GEM²-tree. $VO_{chain}$ can be verified by the client using the blockchain consensus protocol with respect to the latest block. With the verified $VO_{chain}$, the client can then execute MBTreeVerify for each tree in the GEM²-tree to establish the soundness and completeness of the query result. The procedure is similar to that of the MB-tree. The client checks the $VO_{sp}$ for each tree in two aspects:

Soundness Check. The client reconstructs the tree's root hash using the query result R and the hashes of the sibling leaf nodes and adjacent non-leaf nodes in $VO_{sp}$. The check is passed if the reconstructed root hash is identical to the corresponding root hash obtained from $VO_{chain}$.

Completeness Check. There are two cases. If the current tree range does not intersect with the query range, the client can ensure that there is no missing result by checking the boundary information with respect to the query range. Otherwise, the client can establish the completeness by checking the boundary search keys $r_{lb}^-$ and $r_{ub}^+$.

The algorithm for result verification is summarized in Algorithm 6.

Example. FIG. 5 gives an example of authenticated query processing with the GEM²-tree. Consider a range query Q=[10, 15]. The SP traverses all the MB-tree and SMB-trees. For partition $P_1$, there is only one SMB-tree and its key boundaries [13, 91] overlap the query range. The result contains the object with key 13 and $vo_1.1$ consists of {17, [13, 91], $h_2$, $h_6$}. For partition $P_2$, the key boundaries of the left tree $T_l$ (i.e., [18, 43]) do not overlap the query range. Therefore, the SP computes $h(h_8\|h_9)$, and $vo_2.1$ of {[18,43], $h(h_8\|h_9)$}. The right tree $T_r$ in $P_2$ is traversed as the key boundaries [4, 75] overlap the query range, which generates $vo_2.r=\{4, 16, [4, 75], h_{12}\}$. Finally for partition $P_3$, the object with key 10 will be returned as the result and {89} is constructed as $vo_3.1$. Combining everything together, the query result R={10, 13} and $VO_{sp}=\{vo_1.1, vo_2.1, vo_2.r, vo_3.1\}$ are sent to the client. During the result verification, the client first obtains the verified $VO_{chain}=\{h_7, h_{10}, h_{13}, h_{14}\}$ from the blockchain. Next, each tree root is reconstructed as the following:

$$h_7^* = h(13\|91\|h(h(h(13\|17)\|h_2)\|h_6)), h^*_{10} = h(18\|43\|h(h_8\|h_9)).$$

With each of them verified against $VO_{chain}$ and boundary search keys checked against the query range, both the soundness and completeness of the query result can be established.

D. Comparing with Log-Structured Merge-Tree

The Log-Structured Merge-tree (LSM-tree) is a data structure proposed to optimize the I/O cost in the write-dominant environments. Its modern variations usually implement a multilevel structure, which also partitions the data space in an exponential fashion. In this section, the differences between the proposed $GEM^2$-tree and the LSM-tree will be highlighted and why the LSM-tree would fail in their problem will be provided.

LSM-tree requires to maintain long sorted lists. The LSM-tree requires the lists sorted at all levels, using a merge-sort like algorithm. During its merge process, a newly sorted list is created while the old lists are discarded. This would be highly inefficient in the case of the smart contract as too many writes will be incurred. In comparison, the present $GEM^{2-}$tree avoids maintaining sorted lists. The data remains unsorted in the blockchain storage, while the tree structures are computed on the fly.

LSM-tree nodes are materialized. As analyzed in the BASELINE SOLUTIONS section, materializing the tree nodes would incur high overhead during updates.

There is no upper bound of the number of levels in the LSM-tree. With the size of the level enlarged exponentially, the cost of merging two trees is increased proportionally. This is undesirable since a merge operation in the LSM-tree requires building a new fully sorted list and its corresponding tree structure, which yields a complexity of O(N). In contrast, the present $GEM^2$-tree will fall back to a normal MB-tree with batched updates in O(log N) complexity when the size of the largest partition exceeds a certain threshold.

The update operations of the LSM-tree and the $GEM^{2-}$tree are different. The update operation of the LSM-tree is done by appending a new record with a duplicate key. The outdated records are discarded only when the compaction process is invoked. In contrast, the $GEM^2$-tree employs in-place update by locating the partition of the index and updating the corresponding record directly, which is more efficient.

E. Security Analysis

In this section, how to perform a security analysis on the present $GEM^2$-tree and its associated query authentication algorithm is provided. The analysis is started by presenting a formal definition of their security notion.

Definition 1 (Secure). The query authentication algorithm is sound and complete if for all PPT adversaries, the probability is negligible in the following experiment:
  an adversary A selects a dataset D;
  the authentication algorithm constructs the ADS and its corresponding $VO_{chain}$ based on D and sends them to A;
  outputs a tuple of range query Q, result R, and $VO_{sp}$. The adversary A succeeds if $VO_{sp}$ passes the verification with respect to $VO_{chain}$ and satisfies the condition:
  $\{r_i|r_i\notin Q(D)\wedge r_i\in R\}\neq\emptyset \vee \{r_j|r_j\in Q(D)\wedge r_j\notin R\}\neq\emptyset$.

The above definition states that a malicious SP could convince the user of an incorrect or incomplete answer with at most a negligible probability. The proposed query authentication algorithm indeed satisfies the desired security requirement.

Theorem 1. The proposed authenticated query algorithm based on the $GEM^2$-tree is secure if the underlying hash function is collision resistant. This theorem is proven by contradiction.

Case 1: $\{r_i|r_i\notin Q(D)\wedge r_i\in R\}\neq\emptyset$. This means that there is an object in R which is not originated from D. Since the client will reconstruct the hash root of the MB-tree/SMB-tree in which r lies and compare it against the hash root in $VO_{chain}$, such a tampered result means that there exist two MB-trees/SMB-trees with different objects but the same hash root. This implies a successful collision of the underlying hash function, which leads to a contradiction to the present assumption.

Case 2: $\{r_j|r_j\in Q(D)\wedge r_j\notin R\}\neq\emptyset$. This means that there is a valid answer missing from R. Since the client will verify the completeness with the boundary information of the entire tree or the boundary search keys which are adjacent to the query range for each subtree of the $GEM^2$-tree. A missing answer will inevitably lead to a hash collision for some MB-tree/SMB-tree. Then a contradiction to the assumption is arrived.

F. Cost Analysis

In this section, a cost analysis is conducted for both the $GEM^2$-tree maintenance and authenticated query processing.

It is assumed that the database size N is larger than $2S_{max}$. This means that the fully-structured MB-tree always exists in $P_0$. It is also trivial to see that $S_{max}=2^{max}M$ in this case.

ADS Maintenance Cost. First, the $GEM^2$-tree insertion cost is analyzed. Let $P_{Merge}(i)$ be the probability of invoking the merge operation over the partition $P_i$, and $P_{Merge}(max)=1/(2M)$ and $P_{Merge}(i)=P_{Merge}(i+1)/2$. Further, it is derivable that $P_{Merge}(1)$, the probability of the largest SMB-tree partition $P_1$ being inserted to the fully-structured MB-tree, is $1/(2^{max}M)$. Applying the cost analysis of the MB-tree/SMB-tree in BASELINE SOLUTIONS section, the average cost of the $GEM^2$-tree insertion operation is obtained as follows:

$$C^{insert}_{GEM^2\text{-}tree} = C^{insert}_{SMB\text{-}tree}(M) + P_{Merge}(1)\left(C^{insert}_{MB\text{-}tree}(N-2S_{max})S_{max} - C_{bshare}(S_{max})\right) + \sum_{i=2}^{max} P_{Merge}(i) \cdot C^{insert}_{SMB\text{-}tree}(2^{max-i+1}M) \approx$$

-continued $$C_i \log_F(N - 2^{max+1}M) + C_2 \cdot \max^2 + C_3 \cdot \max + C_4 \text{ where}$$

$$C_1 = 2C_{sstore} + 2C_{supdate} + (2F+1)C_{ssload} + C_{hash}$$

$$C_2 = \log 2 \cdot C_{mem}/2$$

$$C_3 = C_{ssload} + C_{hash}/F$$

$$C_4 = 2C_{sstore} + MC_{ssload} + (1 - 2\log_F 2^{max}M)C_{update}$$

Here, $C_{bshare}$ is the cost saved by the bulk insertion of the largest SMB-trees, which can be approximated by $\log_F S_{max}$.

It can be observed that the insertion complexity $C_{GEM^2-tree}^{insert}$ is O(log N) with respect to the database size. Compared with the normal MB-tree, the GEM$^2$-tree is able to trade some portion of the overhead of the MB-tree maintenance with that of the SMB-tree, which leads to a better performance.

Next, the cost of the update operation is analyzed. Let $P_{Update}(i)$ be the probability of updating an object lying in partition $P_i$. Assuming that data updates take place uniformly throughout the whole space, it is possible to obtain $P_{Update}(i)=2^iM/N$ for $i \in [1, \max]$ and $P_{Update}(0)=(N-2S_{max})/N$. Moreover, it is easy to see that the update cost of the MB-tree and SMB-tree is as follows:

$$C_{MB-tree}^{update} = \log_F N(C_{supdate} + (F+1)C_{sload} + C_{hash}) + C_{supdate}$$

$$C_{SMB-tree}^{update} = N\left(C_{sload} + \log N \cdot C_{mem} + \frac{1}{F}C_{hash}\right) + C_{supdate}$$

Thus, the average cost of the GEM$^2$-tree update operation is:

$$C_{GEM^2-tree}^{update} =$$

$$P_{Update}(0) \cdot C_{MB-tree}^{update}(N - 2S_{max}) + \sum_{i=1}^{max} P_{Update}(i) \cdot C_{SMB-tree}^{update}(2^iM) \approx$$

$$\frac{1}{N}(C_5 \log_F(N - 2^{max+1}M)(N - 2^{max+1}M) + C_{supdate}(N - 2^{max+1}M) +$$

$$C_6 2^{2max+2}\max + C_7 2^{2max+2} + C_8 2^{max+1}) \text{ where}$$

$$C_5 = C_{supdate} + (F+1)C_{sload} + C_{hash}$$

$$C_6 = \log 2 \cdot M^2 C_{mem}/3$$

$$C_7 = M^2(C_{ssload} + C_{hash}/F)/3$$

$$C_8 = MC_{supdate}$$

Similar to the insertion, the update cost is in the complexity of O(log N).

Query Processing Cost. The cost of processing a query over a single MB-tree of size N is $C_{query} \cdot \log_F N$, where $C_{query}$ is a constant denoting the query cost of a single node. Since the SP has to traverse all of subtrees inside the GEM$^2$tree, whose sizes are N−2$S_{max}$ for $P_0$ and $2^{max-i}M$ for $P_i$, $i \in [1, \max]$. In the worst case, the SP computation cost and the size of VO$_{sp}$ both are:

$$C_{GEM^2-tree}^{query} = C_{query} \cdot \log_F(N - 2S_{max}) + \sum_{i=1}^{max} C_{query} \cdot \log_F(2^{max-i}M)$$

$$= C_{query}\left(\log_F(N - 2^{max+1}M) + \frac{\log_F 2}{2} \cdot \max^2 +\right.$$

-continued $$\left.\left(\log_F M - \frac{\log_F 2}{2}\right) \cdot \max\right)$$

This is again in the complexity of O(log N). As for VO$_{chain}$, its size is linear to the number of partitions (i.e., max).

Optimized GEM$^2$-Tree

This section describes an optimized index called GEM$^{2*}$-tree, which can further reduce the gas consumption cost without sacrificing much in terms of the query overhead.

A. GEM$^{2*}$-Tree Structure and Maintenance

Figure 6:
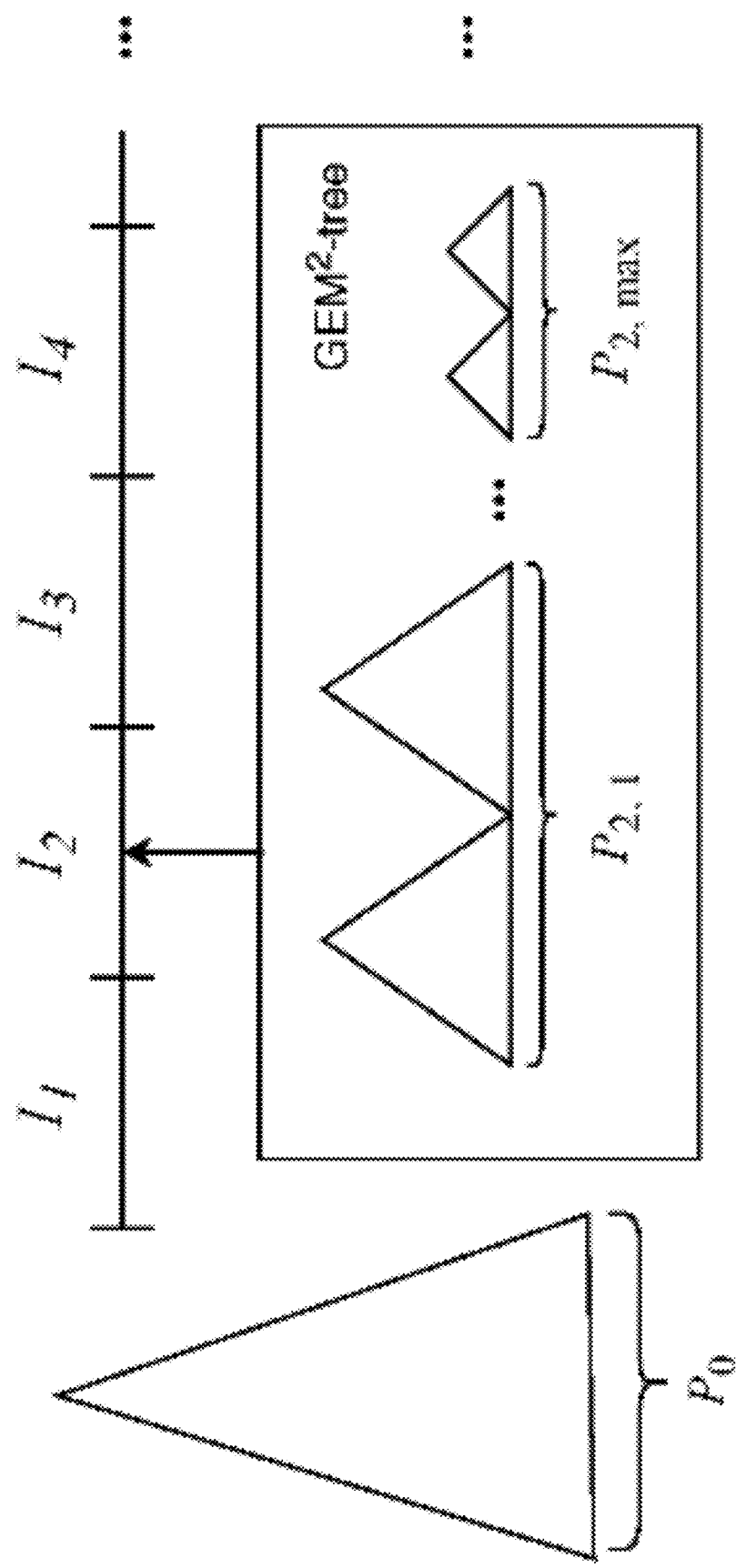
FIG. 6 shows the overall structure of the GEM²*-tree.

The basic structure of the GEM$^{2*}$-tree is a two-level index as shown in FIG. 6. In the upper level, the search key domain is split into several regions $I_1, I_2, I_3, \ldots$. In order to achieve the maximum performance, the split is based on the underlying data distribution so that the keys expected to fall in each region $I_i$ are the same. In the lower level, a GEM$^2$-tree is built for each $I_i$. It is worth noting that there is a slight difference between the GEM$^2$-tree constructed here and the standalone one. Instead of maintaining a fully-structured MB-tree $P_0$ for each GEM$^2$-tree corresponding to each $I_i$, there is only one single fully-structured MB-tree for the entire GEM$^{2*}$-tree. With the above design, the following benefits are expected:

More Gas Savings. Based on the cost analysis in the GAS-EFFICIENT MERKLE MERGE TREE—F. Cost Analysis section, the reduction of the gas consumption of the GEM$^2$-tree compared with the normal MB-tree comes from the use of the SMB-trees in the small to medium-sized partitions. As the GEM$^{2*}$-tree maintains more SMB-trees while avoiding SMB-trees of too large size, thanks to the split search key domain, it can contribute to more gas savings.

Efficient Query Processing Retained. Although the GEM$^{2*}$-tree introduces more subtrees, the query performance is not much sacrificed. The reason is twofold. First, due to the space splitting in the upper level, not all of lower-level index trees need to be visited during the query processing. Moreover, each region $I_i$ contains only a portion of the entire dataset, which leads to smaller trees that can help expedite query processing.

The maintenance of the GEM$^{2*}$-tree is straightforward. During data insertions or updates, the upper-level region is first located based on the boundary information. Then, the corresponding GEM$^2$-tree in the lower level is updated accordingly using the procedure identical to the one introduced in the GAS-EFFICIENT MERKLE MERGE TREE— B. GEM$^2$-tree Maintenance section.

Algorithm 7 Authenicated Query with GEM$^{2*}$-tree (by SP)

Input Query range Q = [lb,ub], GEM$^{2*}$-tree $T^*$
Output Query result R, Verification object VO$_{sp}$
1:  li ← $T^*$.upper_level.BinarySearch(lb);
2:  ui ← $T^*$.upper_level.BinarySearch(ub);
3:  for i in [li,ui] do
4:    ⟨r$_i$,vo$_i$⟩ ← GEM$^2$-tree Query(Q, $T^*$.lower_level[i]);
5:    Append r$_i$ to R, vo$_i$ to VO$_{sp}$;
6:    ⟨r$_0$,vo$_0$⟩ ← MBTreeRangeQuery(Q, $T^*$.P$_0$);
7:    Append r$_0$ to R, vo$_0$ to VO$_{sp}$;

Algorithm 8 Result Verification with GEM²*-tree (by Client)

Input Query range Q = [lb,ub], Query result R, $VO_{sp}$ from the
 SP, $VO_{chain}$ from the blockchain
Output Whether the verification is passed
 1: Verify $VO_{chain}$ w.r.t. the blockchain;
 2: upper_level ← GEM²*-tree upper level from $VO_{chain}$;
 3: li ← upper_level.BinarySearch(lb);
 4: ui ← upper_level.BinarySearch(ub);
 5: for i in [li,ui] do
 6:  $vo_{chain,i}$ ← GEM²-tree root in $VO_{chain}$ for i-th region;
 7:  Extract ⟨$r_i$,$vo_i$⟩ from ⟨R,$VO_{sp}$⟩ w.r.t. i-th region;
 8:  stat ← GEM²*-tree Verify(Q,$r_i$,$vo_i$,$vo_{chain,i}$);
 9:  if stat = false then return false;
 10: $T_0$ ← MB-tree root from $VO_{chain}$ w.r.t. $P_0$;
 11: Extract ⟨$r_0$,$vo_0$⟩ from ⟨R,$VO_{sp}$⟩ w.r.t. $P_0$;
 12: stat ← MBTreeVerify($r_0$,$vo_0$,$T_0$);
 13: if stat = false then return false;
 14: return true;

B. Authenticated Query Processing

The query processing and result verification algorithms with the GEM²*-tree are similar to those of the GEM²tree. Algorithm 7 shows the authenticated query processing procedure. First, a binary search is used to locate the leftmost and rightmost upper-level regions which overlap the query range (lines 1-2). Then, the SP invokes Algorithm 5 for each low-level GEM²-tree under the corresponding region (lines 3-5). Finally, the fully-structured MB-tree is searched (lines 6-7). In a similar manner, the verification procedure is presented in Algorithm 8. It consists of a binary search of the upper-level regions (lines 2-4), verifying the result for each GEM*-tree (lines 5-9), and verifying the result for the fully-structured MB-tree (lines 10-13).

Performance Evaluation

In this section, the performance of the proposed ADSs, namely GEM²-tree and GEM²*-tree, is evaluated.

A. Experimental Settings

The Yahoo Cloud System Benchmark (YCSB) is used to generate synthetic datasets for performance evaluation. All the generated datasets contain 100M update records, in which each search key has a size of 4 bytes and each value has a size of 100 bytes. Two search key distributions, i.e., uniform distribution and zipfian distribution, are evaluated. In the latter, the zipfian constant is set to 0.8 to generate skewed datasets.

For the present GEM²-tree and GEM²*-tree, the following settings are adopted. The maximum size of the smallest SMB-tree, M, is set to 8 as the word size in Ethereum is 32 bytes and the search key has a size of 4 bytes. The fan-out of the MB-tree is set to 4, which is the maximum of f satisfying $(f-1) \times l_d + f \times l_p + l_p < 32$ bytes, where $l_d$ and $l_p$ are the sizes of the delimiters and pointers. The upper bound of the largest SMB-tree partition, $S_{max}$, is set to 2,048, which is based on the cost analysis of the MB-tree and SMB-tree given in BASELINE SOLUTIONS section. Moreover, for the upper-level index of the GEM²*-tree, the search key domain is split into 100 regions based on the key distribution.

In the experiments, a private Ethereum network using Geth is deployed. The smart contract is implemented in Solidity. For each of the SP and the client, a desktop computer with Intel Core i7-7700K 4.2 GHz CPU and 16 GM RAM, running Ubuntu 18.04.1 LTS, is used. The query processing and result verification programs are written in Java. SHA-3 is chosen as the cryptographic hash function in the implementation of all algorithms.

For comparison, two baseline algorithms, MB-tree and LSM-tree, are also implemented. The following metrics are measured to evaluate the algorithms: (i) the blockchain's gas cost for ADS maintenance, (ii) the SP's query processing time, (iii) the size of the VO (including both $VO_{SP}$ and $VO_{chain}$), and (iv) the client's result verification time.

B. Experimental Results

Figure 7A:
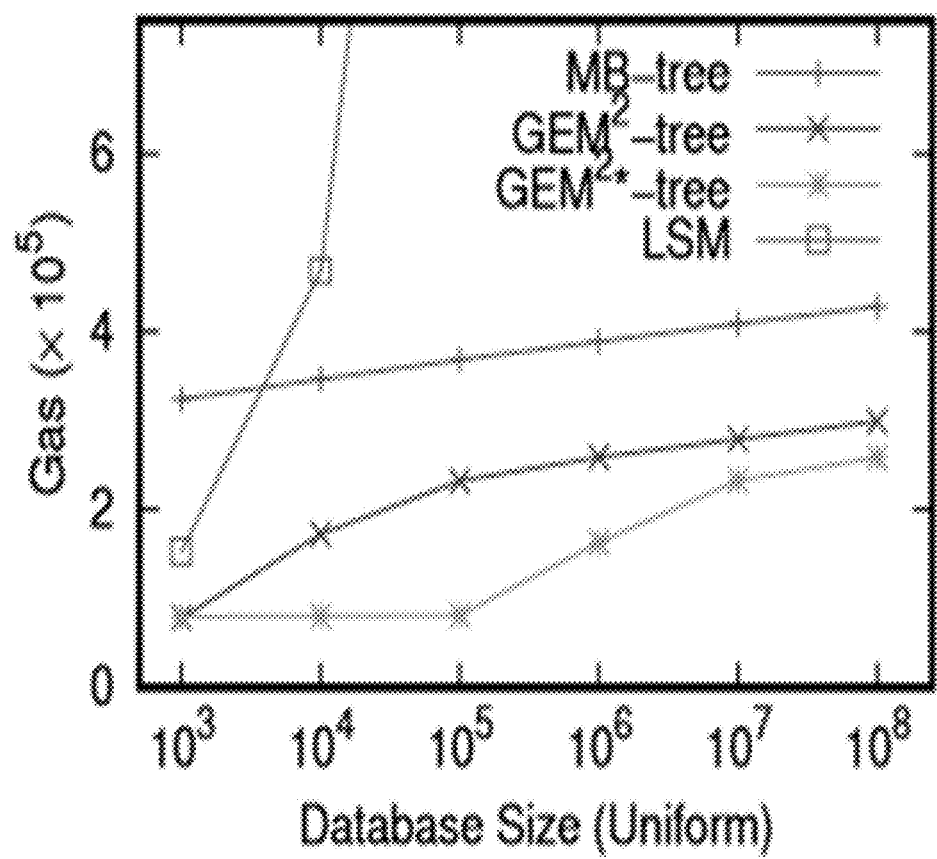
FIG. 7A shows the gas consumption verus database size in uniform distribution.
Figure 7B:
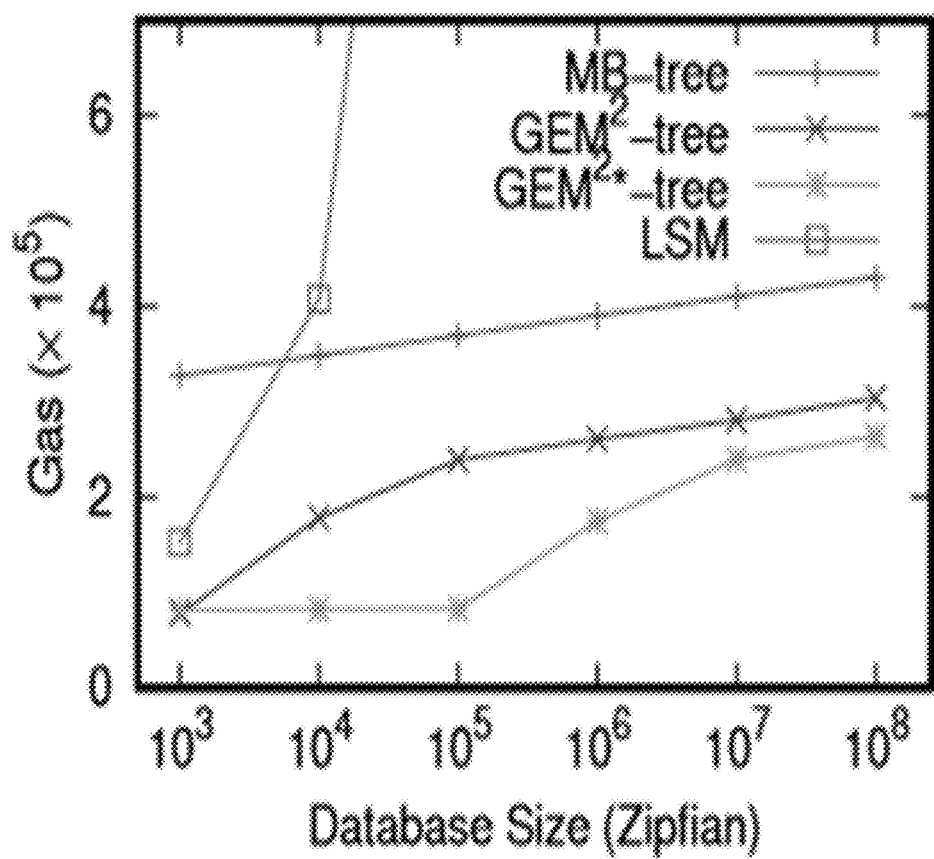
FIG. 7B shows the gas consumption verus database size in Zipfian distribution.

Gas Consumption for ADS Maintenance. FIG. 7A and FIG. 7B shows the average gas consumption with increasing database size. Clearly, the proposed GEM²-tree and GEM²*-tree are more efficient than the two baselines regardless of the data distribution. In particular, the LSM-tree is only able to support the database with up to 10,000 objects. This is mainly because the merge cost in the LSM-tree grows exponentially with its level depth increasing, as discussed in the GAS-EFFICIENT MERKLE MERGE TREE—D. Comparing with Log-Structured Merge-tree section. As such, the LSM-tree is impractical to be maintained by the smart contract. Compared with the MB-tree, the solutions provided herein reduce the gas consumption by a factor of up to 4. The gas reduction comes from both the efficient SMB-trees and the bulk insertion of objects into the MB-tree. Further, the GEM²*-tree always consumes less gas than the GEM²-tree. This is because the GEM²*-tree contains more SMB-trees, which can help serve more objects in an efficient way. Moreover, thanks to the partitioning of the search key space, the objects bulk inserted from the SMB-trees into the MB-tree are more likely to be located in the same range, which makes the bulk insertion more efficient.

Figure 8A:
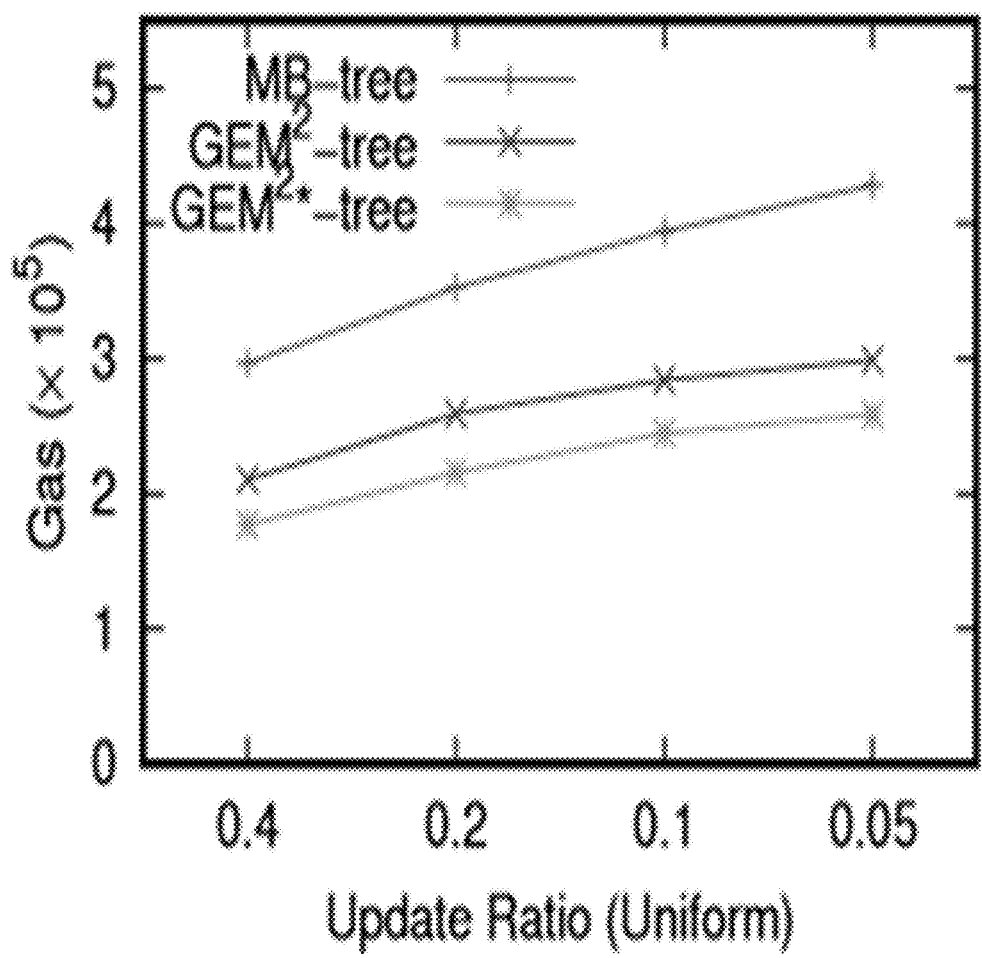
FIG. 8A shows the gas consumption verus update ratio in uniform distribution.
Figure 8B:
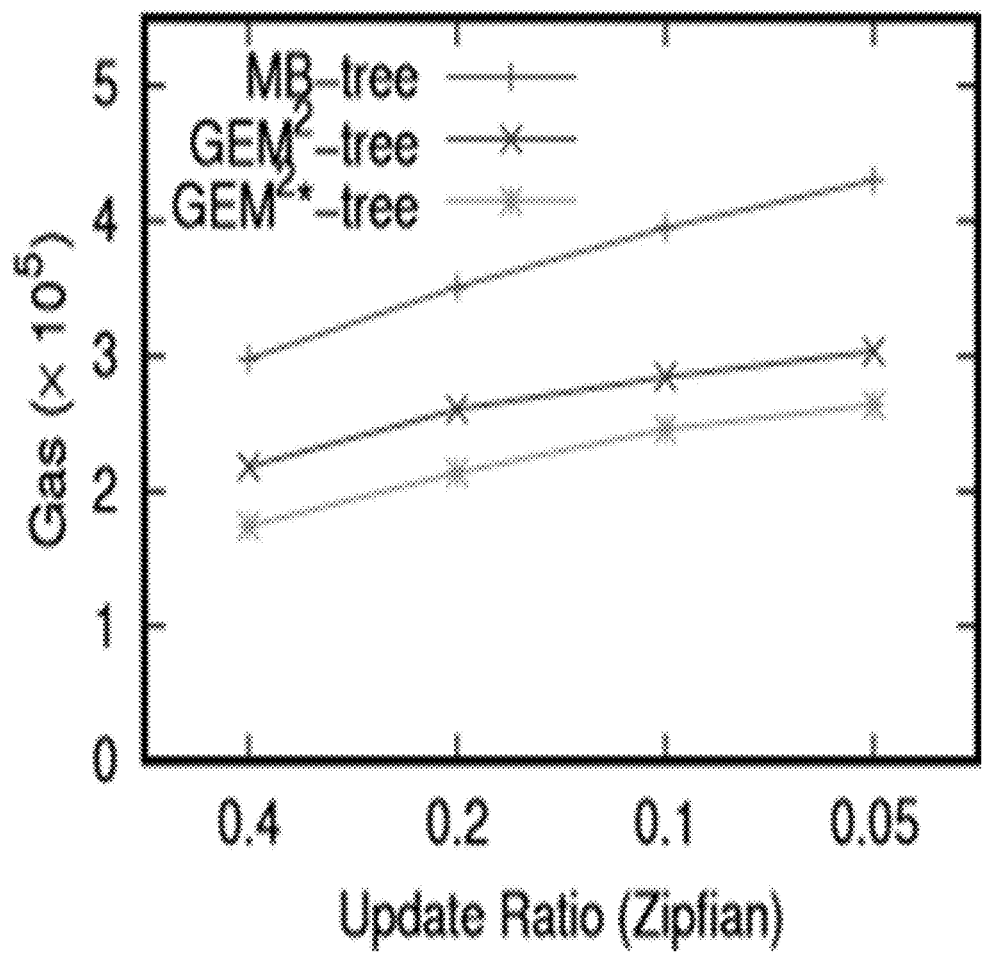
FIG. 8B shows the gas consumption verus update ratio in Zipfian distribution.
Figure 9A:
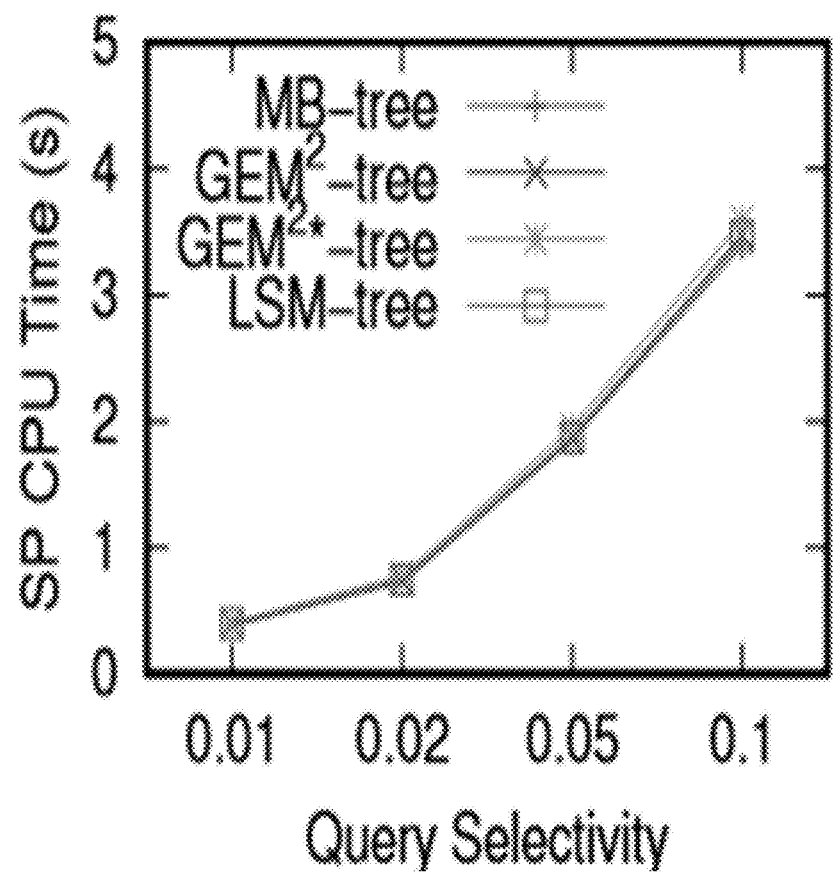
FIG. 9A shows the authenticated query and verification performance in uniform distribution at different SP CPU time(s)
Figure 9B:
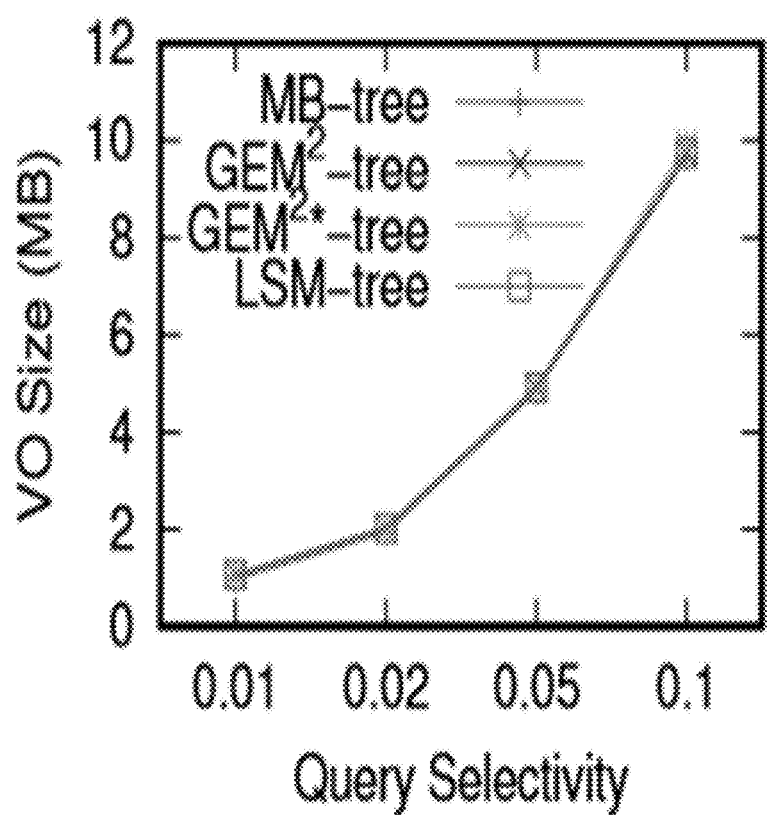
FIG. 9B shows the authenticated query and verification performance in uniform distribution at different VO size (MB)
Figure 9C:
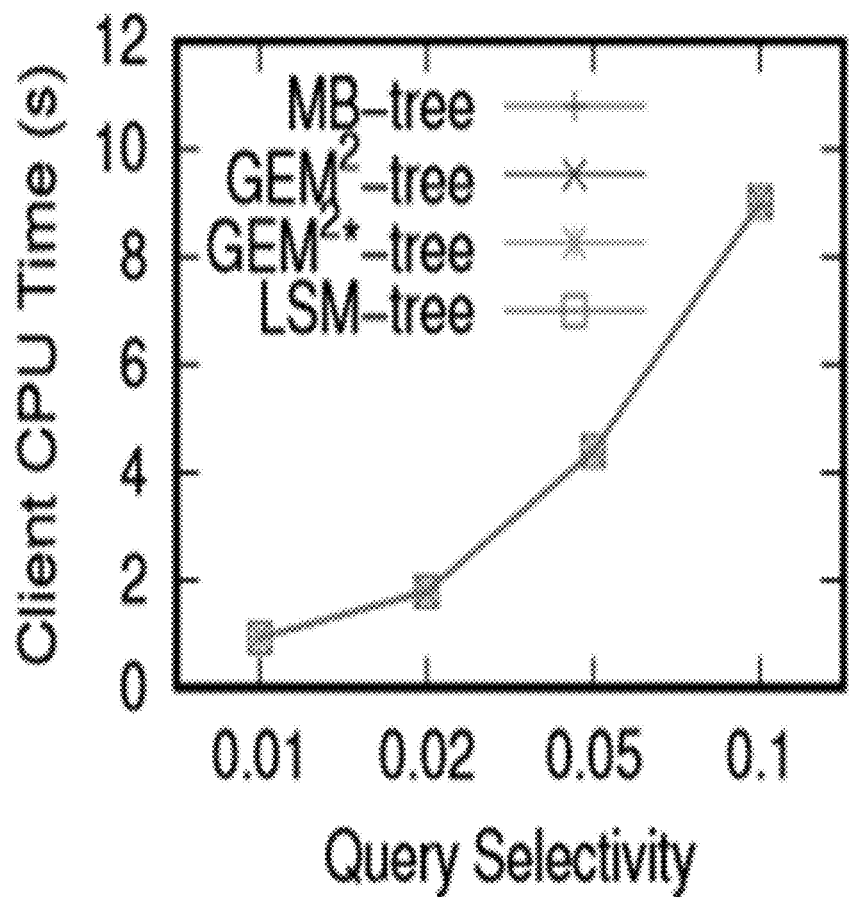
FIG. 9C shows the authenticated query and verification performance in uniform distribution at different client CPU time(s)
Figure 10A:
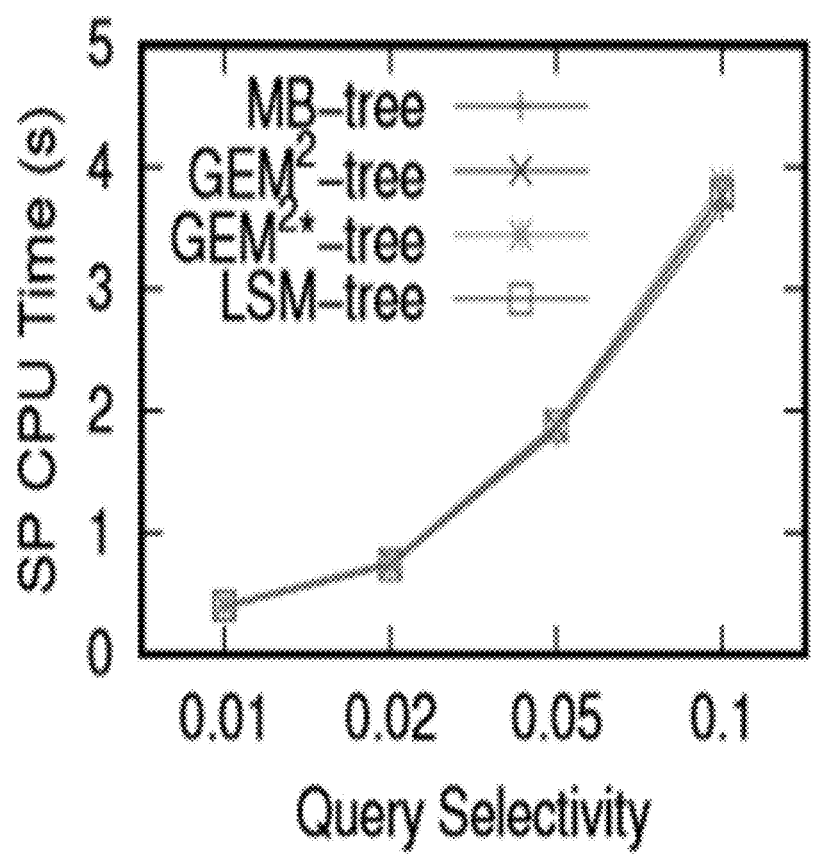
FIG. 10A shows the authenticated query and verification performance in Zipfian distribution at different SP CPU time(s)
Figure 10B:
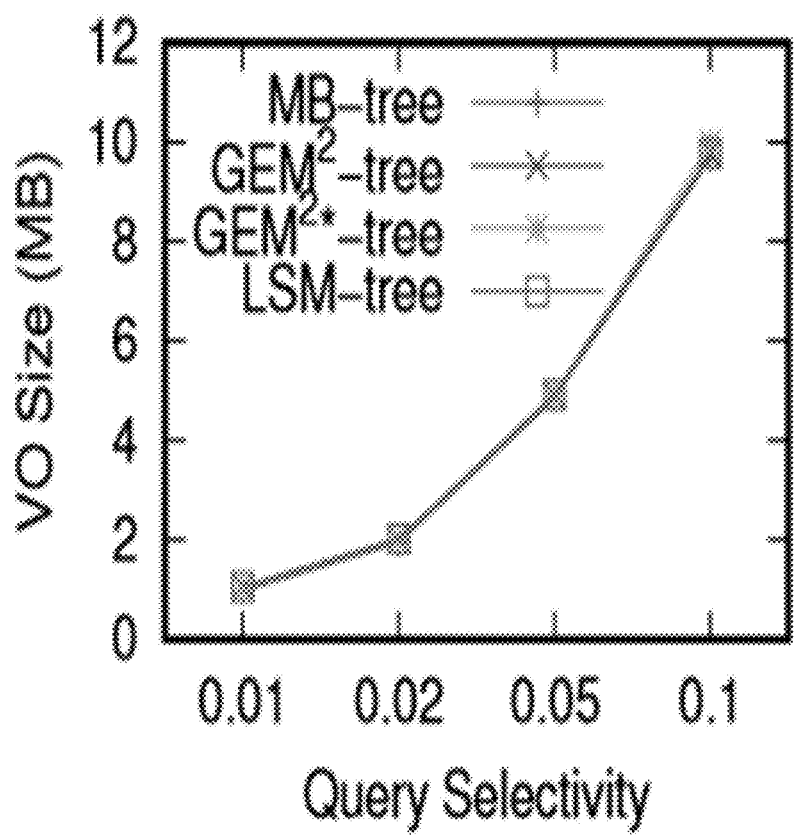
FIG. 10B shows the authenticated query and verification performance in Zipfian distribution at different VO size (MB)
Figure 10C:
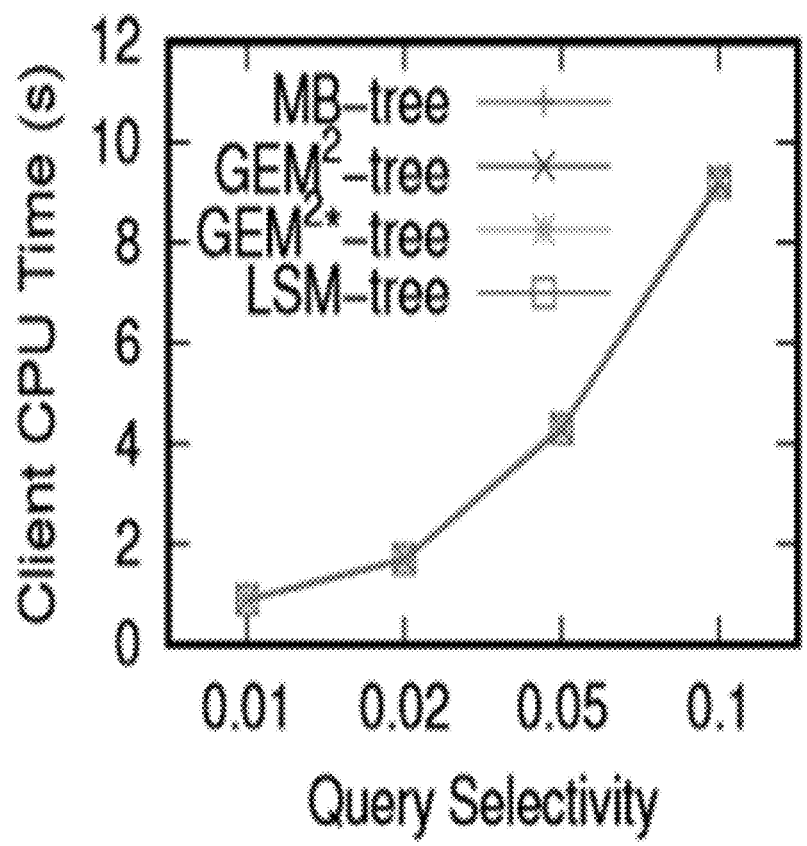
FIG. 10C shows the authenticated query and verification performance in Zipfian distribution at different client CPU time(s).

To further evaluate the performance with respect to data insertions vs. updates, the average gas cost for the workloads with different update ratios is measured. Starting with an existing database that contains 10,000,000 objects, 90,000,000 insertion or update requests are sent to the smart contract. The update ratio is varied from 40% to 5%, which is equivalent to 36,000,000 to 4,500,000 update operations. The average gas cost is plotted in FIG. 8A and FIG. 8B. Since the update cost is lower than the insertion cost, the less the update operations the more gas consumed. It can also be observed that in all cases tested, the GEM²-tree achieves at least 30% gas reduction compared with the MB-tree. The performance of the GEM²*-tree is even better, thanks to its higher capacity for maintaining the SMB-trees and the search key domain regions. Another interesting observation is that the solutions provided herein save more gas against the MB-tree when there are more insertion operations. This further demonstrates the advantages of the present invention.

Query Performance. The query performance of the different algorithms is also analyzed. The results are shown in FIG. 9A to FIG. 9C and FIG. 10A to FIG. 10C. In the experiments, the database size is fixed to be 100M and the query selectivity is varied from 1% to 10%. For each experiment, 50 range queries are randomly generated and the average performance results are reported. As can been seen, for all algorithms, all metrics increase monotonically with the query range regardless of the data distribution. Compared with the MB-tree, the GEM²-tree retains the query performance in all cases tested, while the GEM²*tree is only slightly worse when the query range is large and/or the key distribution is skewed, due to the reasons discussed in the OPTIMIZED GEM$^2$-TREE—A. GEM$^2$*-tree Structure and Maintenance section. Combining with the previous experiments on the ADS maintenance, this demonstrates that the solutions provided herein are able to drastically reduce the maintenance cost with little penalty on the query processing performance.

CONCLUSION

The present invention provides a new method for index-based and integrity-assured search in a blockchain. The main challenge lies in how to design an ADS which can be efficiently maintained by the smart contract in the blockchain. By analyzing the performance of the solutions provided by the various embodiments of the present invention, a novel gas-efficient ADS, called GEM$^2$-tree, that can significantly reduce the storage and computation costs of the smart contract is thereby provided. An optimized ADS, called GEM$^2$*-tree, is also provided. It further saves the maintenance cost by splitting the data domain and introducing a two-level structure. Analytical models and empirical results have substantiated the robustness and efficiency of the solutions.

This invention opens up a new direction for blockchain research. Specifically, many previous query authentication techniques require new design under the gas performance model. For example, it will be interesting to explore how to design gas-efficient data structures for other authenticated queries, such as keyword and aggregation queries.

The present invention is widely applicable to blockchain systems that require data range search functionality. With the solutions proposed by the various embodiments of the present invention, users can enjoy an integrity-assured range search service without joining the blockchain network, which would otherwise require considerable storage, computation, and communication costs to synchronize the entire blockchain. The novelty features and benefits of the present invention are as follows:

1) Fast search response time. With the help of the proposed index structure, range queries can be processed efficiently by the off-chain storage server.
2) Node-to-end data integrity assurance. The present invention allows end users to verify the correctness of the retrieved search results, thus extending the data integrity from blockchain nodes to end users.
3) Supporting scalable off-chain storage. While the raw data can be stored off-chain to achieve system scalability, authenticated information is maintained in the blockchain to enable result verification.
4) Low ledge maintenance cost. The proposed GEM$^2$-tree index is optimized to minimize the blockchain maintenance cost by reducing expensive write operations.

INDUSTRIAL APPLICABILITY

The present invention relates to a method for index-based and integrity-assured search in a blockchain. In particular, the present invention provides a novel gas-efficient ADS, called GEM$^2$-tree, that can significantly reduce the storage and computation costs of the smart contract. An optimized ADS, called GEM$^2$*-tree, is also provided. It further saves the maintenance cost by splitting the data domain and introducing a two-level structure. Analytical models and empirical results have substantiated the robustness and efficiency of the solutions provided herein.

The present invention is widely applicable to blockchain apparatuses that require data range search functionality. With the proposed solutions, users can enjoy an integrity-assured range search service without joining the blockchain network, which would otherwise require considerable storage, computation, and communication costs to synchronize the entire blockchain. The novelty features and benefits of the present invention are as follows:

1) Fast search response time. With the help of the proposed index structure, range queries can be processed efficiently by the off-chain storage server.
2) Node-to-end data integrity assurance. The present invention allows end users to verify the correctness of the retrieved search results, thus extending the data integrity from blockchain nodes to end users.
3) Supporting scalable off-chain storage. While the raw data can be stored off-chain to achieve apparatus scalability, authenticated information is maintained in the blockchain to enable result verification.
4) Low ledge maintenance cost. The proposed GEM$^2$-tree index is optimized to minimize the blockchain maintenance cost by reducing expensive write operations.

An ordinarily skilled person in the art can appreciate that other embodiments comprising different number of local and/or remote processors for executing and performing different aforesaid functions are readily realizable without undue experiments or deviation from the spirit of the present invention.

The embodiments disclosed herein may be implemented using one or more computing devices, computer processors, or electronic circuitries including but not limited to application specific integrated circuits (ASIC), field programmable gate arrays (FPGA), and other programmable logic devices specially configured or programmed according to the teachings of the present disclosure. Machine instructions executing in and/or electronic circuity configurations in the computing devices, computer processors, or programmable logic devices can readily be prepared by practitioners skilled in the computer and electronic art based on the teachings of the present disclosure.

The aforesaid computing devices, computer processors, or electronic circuitries may be incorporated in one or more server computers, personal computers, laptop computers, mobile computing devices such as smartphones and tablet computers.

The electronic embodiments include transient and non-transient electronic storage media having machine instructions and/or electronic circuity configuration data stored therein which can be used to configured computing devices, computer processors, or electronic circuitries to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Various embodiments of the present invention also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method of providing an authenticated data structure (ADS) for a blockchain database comprising:
   splitting the blockchain database into two or more partitions using data statistics of the blockchain database;
   generating an index and the ADS for each of the partitions comprising:
      providing one or more of Merkle B-tree, a suppressed Merkle B-tree, and a combination thereof for each of the partitions of the blockchain database; and
      generating the index and the ADS for each of the partitions;
   maintaining both the index and the ADS during a data insertion operation of the blockchain database using a recursive merge algorithm;
   maintaining the index and the ADS during a data update operation and a data deletion operation of the blockchain database using an in-place algorithm; and
   using the ADS for authentication in a search operation of the blockchain database.

2. The method according to claim 1, wherein the blockchain database is organized into a set of exponentially-sized partitions with a first partition containing one Merkle B-tree and each of the other partitions containing no more than two suppressed Merkle B-tree.

3. The method according to claim 1, wherein a Merkle B-tree is generated for the first of the partitions, the generation comprising:
   building a B-tree over the data stored in the first partition;
   for each leaf node of the B-tree, computing a hash $h(v)$ using a digest of the underlying data v;
   for each non-leaf node of the B-tree, computing a hash $h(h_l \| h_r)$ from the children of the current node by concatenating their respective hashes and applying the hash $h(h_l \| h_r)$ on the concatenated hashes, and
   authenticating the Merkle B-tree based on the hash of the root node.

4. The method according to claim 1 wherein the suppressed Merkle B-tree is generated for each of the partitions other than the first partition of the blockchain database, the generation comprising:
   reading unsorted data of the current partition from the blockchain database;
   building the Merkle B-tree in memory in real time; and
   only storing the hash of the Merkle root in the blockchain database.

5. The method according to claim 1, wherein two or more relatively smaller partitions than the others are merged recursively into a relatively bigger partition in batch and wherein the Merkle roots of said partitions are updated during the data insertion operation.

6. The method according to claim 1, wherein the data update and deletion operations are executed by locating the partition of the data update or deletion and updating the corresponding Merkle root.

7. The method according to claim 1, wherein a service provider uses Merkle B-tress or suppressed Merkle B-trees to answer the blockchain database search request from a user and generates a corresponding verification object (VO).

8. A method for providing a scalable blockchain database search service with data integrity comprising:
   providing a hybrid data storage comprising a blockchain and a cloud storage to store the blockchain database for the scalable blockchain database search service;
   providing a smart contract to maintain an on-chain index and an ADS built according to the method of claim 1, and
   providing the built ADS to answer blockchain database search requests from users with an integrity assurance.

9. The method according to claim 8, wherein the blockchain database is built by steps comprising:
   uploading raw data $o=\langle k, v \rangle$ to a cloud service provider for data storage;
   computing a digest $h(v)$ of the uploaded raw data using a collision resistant cryptographic hash function $h(\cdot)$, and
   uploading the digest $h(v)$ and other information of the uploaded raw data to the blockchain in the form of a blockchain transaction.

10. The method according to claim 9, wherein the on-chain index and ADS is maintained by the smart contract via steps comprising:
    blockchain miners receiving an update transaction from a data owner on the same blockchain network and verifying the authenticity of the received transaction;
    the blockchain miners executing the on-chain index and ADS maintenance algorithms using the digest $h(v)$ and other information of the data obtained from the transaction;
    the blockchain network synchronizing the new index and ADS obtained from the miners and verifying their correctness through a blockchain consensus protocol, and
    the cloud service provider updating an off-chain index and ADS with respect to the changes to the on-chain index and ADS.

11. The method according to claim 10, wherein the cloud service provider answers blockchain database search requests with integrity assurance via steps comprising:
    a user submitting a search request parameter $Q=[lb, ub]$ to the cloud service provider;
    the cloud service provider receiving the search request from the user and computing the search result from the blockchain database thereof using the off-chain index;
    the cloud service provider computing a corresponding verification object (VO) using the ADS with respect to the search request;
    the cloud service provider sending the search results and VO to the user, and
    the user verifying soundness and completeness of the search result using the VO received from the cloud service provider and the ADS retrieved from the blockchain network.

* * * * *